United States Patent
Chen et al.

(10) Patent No.: US 11,733,482 B2
(45) Date of Patent: Aug. 22, 2023

(54) CAMERA OPTICAL LENS

(71) Applicant: AAC Optics (Changzhou) Co., Ltd., Changzhou (CN)

(72) Inventors: Jia Chen, Shenzhen (CN); Wen Sun, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 246 days.

(21) Appl. No.: 17/131,762

(22) Filed: Dec. 23, 2020

(65) Prior Publication Data

US 2021/0263266 A1 Aug. 26, 2021

(30) Foreign Application Priority Data

Feb. 24, 2020 (CN) .......................... 202010111415.1

(51) Int. Cl.
*G02B 9/62* (2006.01)
*G02B 13/18* (2006.01)

(52) U.S. Cl.
CPC .............. *G02B 9/62* (2013.01); *G02B 13/18* (2013.01)

(58) Field of Classification Search
CPC .......... G02B 9/62; G02B 13/02; G02B 13/18; G02B 13/002; G02B 13/0045; G02B 3/02; G02B 3/04; G02B 27/0025
USPC ........................ 359/713, 456, 757
See application file for complete search history.

(56) References Cited

U.S. PATENT DOCUMENTS

| | | | | |
|---|---|---|---|---|
| 8,310,767 B2 * | 11/2012 | Huang | ............... | G02B 13/0045 359/713 |
| 9,019,626 B2 * | 4/2015 | Hsieh | ................. | G02B 13/0045 359/713 |
| 9,019,635 B2 * | 4/2015 | Tsai | ......................... | G02B 9/62 359/713 |
| 11,054,617 B2 * | 7/2021 | Chen | ................... | G02B 13/0045 |
| 11,106,013 B2 * | 8/2021 | Chen | ................... | G02B 27/0025 |
| 2014/0029115 A1 * | 1/2014 | Liao | ......................... | G02B 1/04 359/713 |
| 2014/0320981 A1 * | 10/2014 | Hsieh | ....................... | G02B 9/62 359/713 |
| 2015/0260960 A1 * | 9/2015 | Tang | .................... | G02B 13/0045 359/713 |
| 2015/0268447 A1 * | 9/2015 | Huang | ....................... | G02B 9/62 359/713 |
| 2016/0004039 A1 * | 1/2016 | Chen | .................. | G02B 13/0045 359/713 |

(Continued)

*Primary Examiner* — Tuyen Tra
(74) *Attorney, Agent, or Firm* — W&G Law Group

(57) ABSTRACT

Provided is a camera optical lens, which includes a first lens, a second lens, a third lens, a fourth lens, a fifth lens, and a sixth lens. At least one of the first lens to the sixth lens includes a free-form surface. The camera optical lens satisfies $f3/f1 \leq -1.50$, $-8.50 \leq f2/f \leq -1.50$, and $4.00 \leq (R7+R8)/(R7-R8) \leq 16.00$, where f denotes a focal length of the camera optical lens, f1 denotes a focal length of the first lens, f2 denotes a focal length of the second lens, f3 denotes a focal length of the third lens, R7 denotes a curvature radius of an object-side surface of the fourth lens, and R8 denotes a curvature radius of an image-side surface of the fourth lens. The camera optical lens according to the present disclosure has optical performance and meet the design requirements of being ultra-thin, and having a wide-angle.

9 Claims, 10 Drawing Sheets

(56) References Cited

U.S. PATENT DOCUMENTS

| | | | |
|---|---|---|---|
| 2016/0004040 A1* | 1/2016 | Chen | G02B 13/0045 359/713 |
| 2016/0033745 A1* | 2/2016 | Chen | G02B 5/208 359/713 |
| 2016/0161713 A1* | 6/2016 | Huang | G02B 13/0045 359/713 |
| 2016/0170182 A1* | 6/2016 | Tanaka | G02B 13/0045 359/713 |
| 2016/0187622 A1* | 6/2016 | Huang | G02B 13/0045 359/713 |
| 2017/0235111 A1* | 8/2017 | Hashimoto | G02B 13/0045 359/713 |
| 2018/0024323 A1* | 1/2018 | Teraoka | G02B 9/62 359/713 |
| 2018/0024324 A1* | 1/2018 | Teraoka | G02B 9/62 359/713 |
| 2018/0024325 A1* | 1/2018 | Teraoka | G02B 13/0045 359/713 |
| 2018/0024326 A1* | 1/2018 | Teraoka | G02B 9/62 359/713 |

* cited by examiner

CAMERA OPTICAL LENS

TECHNICAL FIELD

The present disclosure relates to the field of optical lens, and more particularly, to a camera optical lens suitable for handheld terminal devices such as smart phones or digital cameras and suitable for camera devices such as monitors or PC lenses.

BACKGROUND

With the development of camera lenses, requirements for lens imaging is increasingly higher, and "night scene photography" and "background blur" of the lens have also become important indicators for evaluating the imaging of the lens. Currently, rotationally symmetric aspherical surfaces are mostly used, such aspherical surfaces only have sufficient degrees of freedom in a meridian plane, and off-axis aberrations cannot be well corrected. A free-form surface is of a non-rotationally symmetric surface, which can better balance aberrations and improve imaging quality, and processing of the free-form surface is gradually mature. With the increase in requirements for lens imaging, it is very important to add the free-form surface when designing the lens, especially in designs of wide-angle lenses and ultra-wide-angle lenses.

SUMMARY

In view of the problems, the present disclosure provides a camera lens, which can have characteristics of being ultra-thin and having a wide-angle while achieving a good optical performance.

In an embodiment, the present disclosure provides a camera optical lens. The camera optical lens includes, from an object side to an image side, a first lens, a second lens, a third lens, a fourth lens, a fifth lens, and a sixth lens. At least one of the first lens, the second lens, the third lens, the fourth lens, the fifth lens, or the sixth lens comprises a free-form surface. The camera optical lens satisfies following conditions: $f3/f1 \leq -1.50$; $-8.50 \leq f2/f \leq -1.50$; and $4.00 \leq (R7+R8)/(R7-R8) \leq 16.00$, where f denotes a focal length of the camera optical lens, f1 denotes a focal length of the first lens, f2 denotes a focal length of the second lens, f3 denotes a focal length of the third lens, R7 denotes a curvature radius of an object-side surface of the fourth lens, and R8 denotes a curvature radius of an image-side surface of the fourth lens.

As an improvement, the camera optical lens further satisfies a following condition: $0.30 \leq d6/d8 \leq 1.00$, where d6 denotes an on-axis distance from an image-side surface of the third lens to the object-side surface of the fourth lens, and d8 denotes an on-axis distance from the image-side surface of the fourth lens to an object-side surface of the fifth lens.

As an improvement, the camera optical lens further satisfies a following condition: $R9/R10 \leq -1.50$, where R9 denotes a curvature radius of an object-side surface of the fifth lens, and R10 denotes a curvature radius of an image-side surface of the fifth lens.

As an improvement, the camera optical lens further satisfies following conditions: $0.47 \leq f1/f \leq 1.83$; $-4.50 \leq (R1+R2)/(R1-R2) \leq -0.64$; and $0.05 \leq d1/TTL \leq 0.22$, where R1 denotes a curvature radius of an object-side surface of the first lens, R2 denotes a curvature radius of an image-side surface of the first lens, d1 denotes an on-axis thickness of the first lens, and TTL denotes a total optical length from the object-side surface of the first lens to an image plane of the camera optical lens along an optic axis.

As an improvement, the camera optical lens further satisfies following conditions: $1.58 \leq (R3+R4)/(R3-R4) \leq 12.63$; and $0.02 \leq d3/TTL \leq 0.07$, where R3 denotes a curvature radius of an object-side surface of the second lens, R4 denotes a curvature radius of an image-side surface of the second lens, d3 denotes an on-axis thickness of the second lens, and TTL denotes a total optical length from an object-side surface of the first lens to an image plane of the camera optical lens along an optic axis.

As an improvement, the camera optical lens further satisfies following conditions: $-186.28 \leq f3/f \leq -1.35$; $-20.14 \leq (R5+R6)/(R5-R6) \leq 1.99$; and $0.03 \leq d5/TTL \leq 0.17$, where R5 denotes a curvature radius of an object-side surface of the third lens, R6 denotes a curvature radius of an image-side surface of the third lens, d5 denotes an on-axis thickness of the third lens, and TTL denotes a total optical length from an object-side surface of the first lens to an image plane of the camera optical lens along an optic axis.

As an improvement, the camera optical lens further satisfies following conditions: $-23.84 \leq f4/f \leq -1.23$; and $0.02 \leq d7/TTL \leq 0.08$, where f4 denotes a focal length of the fourth lens, d7 denotes an on-axis thickness of the fourth lens, and TTL denotes a total optical length from an object-side surface of the first lens to an image plane of the camera optical lens along an optic axis.

As an improvement, the camera optical lens further satisfies following conditions: $0.22 \leq f5/f \leq 1.06$; $0.16 \leq (R9+R10)/(R9-R10) \leq 1.49$; and $0.08 \leq d9/TTL \leq 0.32$, where f5 denotes a focal length of the fifth lens, R9 denotes a curvature radius of an object-side surface of the fifth lens, R10 denotes a curvature radius of an image-side surface of the fifth lens, d9 denotes an on-axis thickness of the fifth lens, and TTL denotes a total optical length from an object-side surface of the first lens to an image plane of the camera optical lens along an optic axis.

As an improvement, the camera optical lens further satisfies following conditions: $-1.21 \leq f6/f \leq -0.37$; $0.07 \leq (R11+R12)/(R11-R12) \leq 1.19$; and $0.04 \leq d11/TTL \leq 0.13$, where f6 denotes a focal length of the sixth lens, R11 denotes a curvature radius of an object-side surface of the sixth lens, R12 denotes a curvature radius of an image-side surface of the sixth lens, d11 denotes an on-axis thickness of the sixth lens, and TTL denotes a total optical length from an object-side surface of the first lens to an image plane of the camera optical lens along an optic axis.

As an improvement, the camera optical lens further satisfies a following condition: $Fno \leq 1.91$, where Fno denotes an F number of the camera optical lens.

The camera optical lens of the present disclosure has a good optical performance and has characteristic of being ultra-thin and having a wide-angle, and it is particularly suitable for camera lens assembly of mobile phones and WEB camera lenses that are formed by imaging elements for high pixel, such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
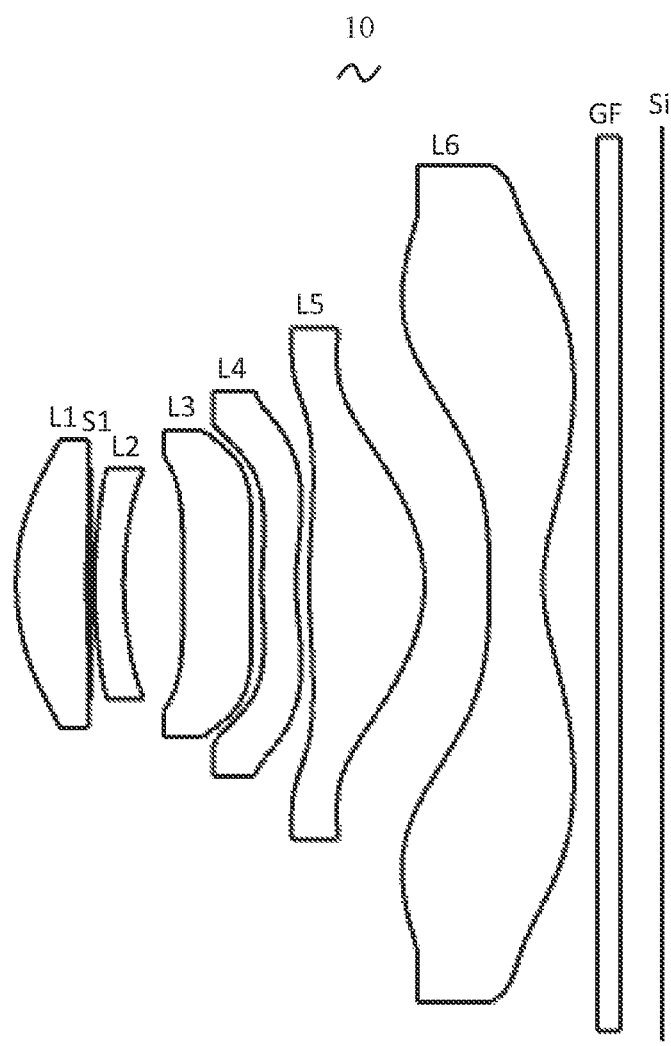
FIG. 1 is a structural schematic diagram of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes seven lenses. Specifically, the camera optical lens 10 includes a first lens L1, an aperture S1, a second lens L2, a third lens L3, a fourth lens L4, a fifth lens L5, and a sixth lens L6 that are sequentially arranged from an object side to an image side. An optical element such as an optical filter (GF) can be arranged between the sixth lens L6 and an image plane Si.

In the present embodiment, the first lens L1 is made of a plastic material, the second lens L2 is made of a plastic material, the third lens L3 is made of a plastic material, the fourth lens L4 is made of a plastic material, the fifth lens L5 is made of a plastic material, and the sixth lens L6 is made of a plastic material.

In the present embodiment, the first lens L1 has a positive refractive power, the second lens L2 has a negative refractive power, the third lens L3 has a negative refractive power, the fourth lens L4 has a negative refractive power, the fifth lens L5 has a positive refractive power, and the sixth lens L6 has a negative refractive power.

In the present embodiment, at least one of the first lens L1, the second lens L2, the third lens L3, the fourth lens L4, the fifth lens L5, or the sixth lens L6 includes a free-form surface, and therefore aberrations can be effectively corrected, which further improves a performance of the optical system.

A focal length of the first lens L1 is defined as f1, and a focal length of the third lens L3 is defined as f3, and the camera optical lens 10 satisfies a condition of $f3/f1 \leq -1.50$, which specifies a ratio of the focal length of the third lens to the focal length of the first lens. By reasonably distributing the focal length, the system is enabled to have better imaging quality and low sensitivity. As an example, $f3/f1 \leq -1.58$.

A focal length of the camera optical lens 10 is defined as f, and a focal length of the second lens L2 is defined as f2, and the camera optical lens 10 satisfies a condition of $-8.50 \leq f2/f \leq -1.50$, which specifies a ratio of the focal length of the second lens to the focal length of the system. This condition can effectively balance spherical aberration and field curvature of the system. As an example, $-8.28 \leq f2/f \leq -1.74$.

A curvature radius of an object-side surface of the fourth lens L4 is defined as R7, and a curvature radius of an image-side surface of the fourth lens L4 is defined as R8, and the camera optical lens 10 satisfies a condition of $4.00 \leq (R7+R8)/(R7-R8) \leq 16.00$, which specifies a shape of the fourth lens. This condition can facilitate the assembly and processing of lenses. As an example, $4.25 \leq (R7+R8)/(R7-R8) \leq 15.53$.

An on-axis distance from an image-side surface of the third lens L3 to an object-side surface of the fourth lens L4 is defined as d6, and an on-axis distance from an image-side surface of the fourth lens L4 to an object-side surface of the fifth lens L5 is defined as d8, and the camera optical lens 10 satisfies a condition of $0.30 \leq d6/d8 \leq 1.00$, which specifies a ratio of an air gap between the third lens and the fourth lens to an air gap between the fourth lens and the fifth lens. This condition facilitates the compression of the total optical length, thereby achieving an ultra-thin effect. As an example, $0.32 \leq d6/d8 \leq 0.95$.

A curvature radius of an object-side surface of the fifth lens is defined as R9, and a curvature radius of an image-side surface of the fifth lens is defined as R10, and the camera optical lens 10 satisfies a condition of $R9/R10 \leq -1.50$, which specifies a shape of the fifth lens. This condition can lower a degree of deflection of light passing through the lens, thereby effectively reducing the aberration. As an example, $R9/R10 \leq -1.73$.

In the present embodiment, the first lens L1 includes an object-side surface being convex at a paraxial position, and an image-side surface being concave at the paraxial position.

A focal length of the first lens L1 is defined as f1, a focal length of the camera optical lens 10 is defined as f, and the camera optical lens 10 satisfies: $0.47 \leq f1/f \leq 1.83$, which specifics a ratio of the focal length f1 of the first lens L1 to the focal length f of the camera optical lens. When the condition is satisfied, the first lens L1 can have an appropriate positive refractive power, thereby facilitating reducing aberrations of the system while facilitating development towards ultra-thin and wide-angle. As an example, $0.75 \leq f1/f \leq 1.46$.

A curvature radius of an object-side surface of the first lens L1 is R1, and a curvature radius of an image-side surface of the first lens L1 is R2, and the camera optical lens 10 satisfies a condition of $-4.50 \leq (R1+R2)/(R1-R2) \leq -0.64$. This condition can reasonably control a shape of the first lens L1, allowing the first lens L1 to effectively correct the spherical aberration of the system. As an example, $-2.81 \leq (R1+R2)/(R1-R2) \leq -0.80$.

An on-axis thickness of the first lens L1 is defined as d1, a total optical length from the object-side surface of the first lens L1 to the image plane of the camera optical lens 10 along an optic axis is defined as TTL, and the camera optical lens 10 satisfies a condition of $0.05 \leq d1/TTL \leq 0.22$. This condition can facilitate achieving ultra-thin lenses. As an example, $0.09 \leq d1/TTL \leq 0.18$.

In the present embodiment, the second lens L2 includes an object-side surface being convex in a paraxial region and an image-side surface being concave in the paraxial region.

A curvature radius of the object-side surface of the second lens L2 is defined as R3, a curvature radius of the image-side surface of the second lens L2 is defined as R4, and the camera optical lens 10 satisfies a condition of $-1.58 \leq (R3+R4)/(R3-R4) \leq 12.63$, which specifies a shape of the second lens L2. This condition can facilitate correction of an on-axis aberration with development towards ultra-thin lenses. As an example, $2.53 \leq (R3+R4)/(R3-R4) \leq 10.11$.

An on-axis thickness of the second lens L2 is defined as d3, the total optical length from the object-side surface of the first lens L1 to an image plane of the camera optical lens 10 along an optic axis is defined as TTL, and the camera optical lens 10 satisfies a condition of $0.02 \leq d3/TTL \leq 0.07$, which can facilitate achieving ultra-thin lenses. As an example, $0.03 \leq d3/TTL \leq 0.06$.

In the present embodiment, the third lens L3 includes an object-side surface being concave in a paraxial region and an image-side surface being convex in the paraxial region.

As an example, a focal length of the camera optical lens 10 is f, a focal length of the third lens L3 is f3, and the camera optical lens 10 satisfies a condition of $-186.28 \leq f3/f \leq -1.35$. The appropriate distribution of the refractive power leads to better imaging quality and a lower sensitivity of the system. As an example, $-116.42 \leq f3/f \leq -1.69$.

A curvature radius of the object-side surface of the third lens L3 is defined as R5, a curvature radius of the image-side surface of the third lens L3 is defined as R6, and the camera optical lens 10 satisfies a condition of $-20.14 \leq (R5+R6)/(R5-R6) \leq 1.99$. With This condition, a shape of the third lens L3 is controlled. This configuration can alleviate the deflection degree of light passing through the lens with such condition while effectively reducing aberrations. As an example, $-12.59 \leq (R5+R6)/(R5-R6) \leq 1.59$.

An on-axis thickness of the third lens L3 is defined as d5, the total optical length from the object-side surface of the first lens L1 to an image plane of the camera optical lens 10 along an optic axis is defined as TTL, and the camera optical lens 10 satisfies a condition of $0.03 \leq d5/TTL \leq 0.17$, which can facilitate achieving ultra-thin lenses. As an example, $0.05 \leq d5/TTL \leq 0.14$.

In the present embodiment, the fourth lens L4 includes an object-side surface being convex in a paraxial region and an image-side surface being concave in the paraxial region.

A focal length of the fourth lens L4 is defined as f4, and a focal length of the camera optical lens 10 is defined as f, and the camera optical lens 10 satisfies a condition of $-23.84 \leq f4/f \leq -1.23$, which specifies a ratio of the focal length of the fourth lens to the focal length of the system. This condition is conducive to improving performance of the optical system. As an example, $-14.90 \leq f4/f \leq -1.53$.

An on-axis thickness of the fourth lens L4 is defined as d7, the total optical length from the object-side surface of the first lens L1 to an image plane of the camera optical lens 10 along an optic axis is defined as TTL, and the camera optical lens 10 satisfies a condition of $0.02 \leq d7/TTL \leq 0.08$. This condition can facilitate achieving ultra-thin lenses. As an example, $0.04 \leq d7/TTL \leq 0.07$.

In the present embodiment, the fifth lens L5 includes an object-side surface being convex in a paraxial region and an image-side surface being convex in the paraxial region.

A focal length of the fifth lens L5 is f5, the focal length of the camera optical lens 10 is f, and the camera optical lens 10 further satisfies a condition of $0.22 \leq f5/f \leq 1.06$. This condition can effectively make a light angle of the camera optical lens 10 gentle and reduce the tolerance sensitivity. As an example, $0.36 \leq f5/f \leq 0.85$.

A curvature radius of the object-side surface of the fifth lens is defined as R9, a curvature radius of the image-side surface of the fifth lens is defined as R10, and the camera optical lens 10 satisfies a condition of $0.16 \leq (R9+R10)/(R9-R10) \leq 1.49$, which specifies a shape of the fifth lens L5. This can facilitate correction of an off-axis aberration with development towards ultra-thin, wide-angle lenses. As an example, $0.26 \leq (R9+R10)/(R9-R10) \leq 1.19$.

As an example, an on-axis thickness of the fifth lens L5 is defined as d9, the total optical length from the object-side surface of the first lens L1 to an image plane of the camera optical lens 10 along an optic axis is defined as TTL, and the camera optical lens 10 satisfies a condition of $0.08 \leq d9/TTL \leq 0.32$, which can facilitate achieving ultra-thin lenses. As an example, $0.12 \leq d9/TTL \leq 0.25$.

In the present embodiment, the sixth lens L6 includes an object-side surface being concave in a paraxial region and an image-side surface being concave in the paraxial region.

A focal length of the sixth lens L6 is f6, the focal length of the camera optical lens 10 is f, and the camera optical lens 10 satisfies a condition of $-1.21 \leq f6/f \leq -0.37$. By satisfying this condition, the appropriate distribution of the refractive power leads to better imaging quality and a lower sensitivity of the system. As an example, $-0.76 \leq f6/f \leq -0.46$.

A curvature radius of the object-side surface of the sixth lens L6 is defined as R11, a curvature radius of the image-side surface of the sixth lens L6 is defined as R12, and the camera optical lens 10 satisfies a condition of $0.07 \leq (R11+R12)/(R11-R12) \leq 1.19$, which specifies a shape of the sixth lens L6. This condition can facilitate correction of an off-axis aberration with development towards ultra-thin and wide-angle lenses. As an example, $0.07 \leq (R11+R12)/(R11-R12) \leq 0.95$.

A longitudinal thickness of the sixth lens L6 is d11, and a total optical length of the camera optical lens 10 is TTL, which satisfy the following relational expression: $0.04 \leq d11/TTL \leq 0.13$, which can facilitate achieving ultra-thin lenses. As an example, $0.06 \leq d11/TTL \leq 0.11$.

In the present embodiment, an F number (Fno) of the camera optical lens 10 is smaller than or equal to 1.91, such that the camera optical lens 10 has a large aperture and good imaging performance. For example, Fno is smaller than or equal to 1.87.

In the present embodiment, the total optical length TTL of the camera optical lens 10 is smaller than or equal to 6.49 mm, which is beneficial for achieving ultra-thin lenses. As an example, the total optical length TTL of the camera optical lens 10 is smaller than or equal to 6.20 mm.

When the above relationship is satisfied, the camera optical lens 10 has good optical performance, and adopting a free-form surface can achieve matching of a design image area with an actual use area, to maximize the image quality of an effective area. With these characteristics, the camera optical lens 10 is suitable for camera optical lens assembly of mobile phones and WEB camera optical lenses formed by imaging elements for high pixel such as CCD and CMOS.

The following examples are used to describe the camera optical lens 10 according to the present disclosure. The symbols recorded in each example will be described as follows. The focal length, on-axis distance, curvature radius, and on-axis thickness are all in units of mm.

TTL: total optical length (total optical length from the object-side surface of the first lens L1 to the image plane of the camera optical lens along the optic axis), in units of mm.

Table 1 and Table 2 shows design data of the camera optical lens 10 according to Embodiment 1 of the present disclosure. The object-side surface and the image-side surface of the first lens L1 are free-form surfaces.

TABLE 1

| | R | | d | nd | | vd | |
|---|---|---|---|---|---|---|---|
| S1 | ∞ | d0= | −0.681 | | | | |
| R1 | 2.193 | d1= | 0.643 | nd1 | 1.5444 | v1 | 55.82 |
| R2 | 8.723 | d2= | 0.069 | | | | |
| R3 | 3.934 | d3= | 0.270 | nd2 | 1.6800 | v2 | 18.40 |
| R4 | 3.099 | d4= | 0.546 | | | | |
| R5 | −31.701 | d5= | 0.616 | nd3 | 1.5444 | v3 | 55.82 |
| R6 | 5.574 | d6= | 0.102 | | | | |
| R7 | 2.684 | d7= | 0.311 | nd4 | 1.6800 | v4 | 18.40 |
| R8 | 1.706 | d8= | 0.114 | | | | |
| R9 | 2.798 | d9= | 1.059 | nd5 | 1.5444 | v5 | 55.82 |
| R10 | −1.427 | d10= | 0.595 | | | | |
| R11 | −9.986 | d11= | 0.492 | nd6 | 1.5438 | v6 | 56.03 |
| R12 | 1.669 | d12= | 0.500 | | | | |
| R13 | ∞ | d13= | 0.210 | ndg | 1.5168 | vg | 64.17 |
| R14 | ∞ | d14= | 0.372 | | | | |

In the table, meanings of various symbols will be described as follows.

S1: aperture;
R: curvature radius of the optical surface; central curvature radius in the case of a lens;
R1: curvature radius of the object-side surface of the first lens L1;
R2: curvature radius of the image-side surface of the first lens L1;
R3: curvature radius of the object-side surface of the second lens L2;
R4: curvature radius of the image-side surface of the second lens L2;
R5: curvature radius of the object-side surface of the third lens L3;
R6: curvature radius of the image-side surface of the third lens L3;
R7: curvature radius of the object-side surface of the fourth lens L4;
R8: curvature radius of the image-side surface of the fourth lens L4;
R9: curvature radius of the object-side surface of the fifth lens L5;
R10: curvature radius of the image-side surface of the fifth lens L5;
R11: curvature radius of the object-side surface of the sixth lens L6;
R12: curvature radius of the image-side surface of the sixth lens L6;
R13: curvature radius of the object-side surface of the optical filter GF;
R14: curvature radius of the image-side surface of the optical filter GF;
d: longitudinal thickness of the lens and on-axis distance between the lenses;
d0: on-axis distance from the aperture S1 to the object-side surface of the first lens L1;
d1: longitudinal thickness of the first lens L1;
d2: on-axis distance from the image-side surface of the first lens L1 to the object-side surface of the second lens L2;
d3: longitudinal thickness of the second lens L2;
d4: on-axis distance from the image-side surface of the second lens L2 to the object-side surface of the third lens L3;
d5: longitudinal thickness of the third lens L3;
d6: on-axis distance from the image-side surface of the third lens L3 to the object-side surface of the fourth lens L4;
d7: longitudinal thickness of the fourth lens L4;
d8: on-axis distance from the image-side surface of the fourth lens L4 to the object-side surface of the fifth lens L5;
d9: longitudinal thickness of the fifth lens L5;
d10: on-axis distance from the image-side surface of the fifth lens L5 to the object-side surface of the sixth lens L6;
d11: longitudinal thickness of the sixth lens L6;
d12: on-axis distance from the image-side surface of the sixth lens L6 to the object-side surface of the optical filter GF;
d13: longitudinal thickness of the optical filter GF;
d14: on-axis distance from the image-side surface of the optical filter GF to an image surface;
nd: refractive index of the d-line;
nd1: refractive index of the d-line of the first lens L1;
nd2: refractive index of the d-line of the second lens L2;
nd3: refractive index of the d-line of the third lens L3;
nd4: refractive index of the d-line of the fourth lens L4;
nd5: refractive index of the d-line of the fifth lens L5;
nd6: refractive index of the d-line of the sixth lens L6;
ndg: refractive index of the d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6; and
vg: abbe number of the optical filter GF.

Table 2 shows aspherical surface data of respective lens in the camera optical lens 10 according to Embodiment 1 of the present disclosure.

TABLE 2

| | Conic coefficient | Aspherical coefficient | | | |
|---|---|---|---|---|---|
| | k | A4 | A6 | A8 | A10 |
| R3 | −7.4461E+00 | −7.2452E−02 | 9.6757E−02 | −6.4432E−02 | 2.5637E−02 |
| R4 | −3.5456E+00 | −2.1477E−02 | 5.0801E−02 | −7.4049E−02 | 1.2513E−01 |
| R5 | 8.5000E+01 | −4.5160E−02 | 5.4146E−03 | −1.8222E−01 | 5.6310E−01 |
| R6 | −7.5944E+01 | −3.2372E−01 | 9.5024E−01 | −2.0083E+00 | 2.5610E+00 |
| R7 | −6.1495E+01 | −4.3191E−01 | 1.0980E+00 | −2.0849E+00 | 2.4995E+00 |
| R8 | −2.9803E+01 | −3.3140E−01 | 7.0569E−01 | −1.0465E+00 | 9.6568E−01 |

TABLE 2-continued

| | | | | | |
|---|---|---|---|---|---|
| R9 | −6.0226E+01 | −1.9298E−01 | 4.0326E−01 | −5.0124E−01 | 3.7638E−01 |
| R10 | −2.4879E+00 | −2.2011E−02 | 2.6391E−05 | 7.4505E−03 | −5.7929E−03 |
| R11 | 7.3587E+00 | −8.4480E−02 | 2.5429E−02 | −6.0356E−03 | 1.6852E−03 |
| R12 | −5.5570E+00 | −6.1545E−02 | 2.3450E−02 | −6.7600E−03 | 1.3597E−03 |

| | Aspherical coefficient | | | | |
|---|---|---|---|---|---|
| | A12 | A14 | A16 | A18 | A20 |
| R3 | −1.0131E−03 | 0.0000E+00 | 0.0000E+00 | 0.0000E+00 | 0.0000E+00 |
| R4 | −1.1086E−01 | 4.2032E−02 | 0.0000E+00 | 0.0000E+00 | 0.0000E+00 |
| R5 | −9.9780E−01 | 1.0069E+00 | −5.5035E−01 | 1.2612E−01 | 0.0000E+00 |
| R6 | −2.0877E+00 | 1.0464E+00 | −2.9321E−01 | 3.5290E−02 | 0.0000E+00 |
| R7 | −2.0240E+00 | 1.1049E+00 | −3.9104E−01 | 8.1796E−02 | −7.7067E−03 |
| R8 | −5.8505E−01 | 2.3593E−01 | −6.1655E−02 | 9.5027E−03 | −6.5388E−04 |
| R9 | −1.7806E−01 | 5.3041E−02 | −9.6099E−03 | 9.6649E−04 | −4.1411E−05 |
| R10 | 3.4891E−03 | −1.1868E−03 | 2.1427E−04 | −1.9502E−05 | 7.0682E−07 |
| R11 | −3.3535E−04 | 3.9770E−05 | −2.7162E−06 | 9.8956E−08 | −1.4839E−09 |
| R12 | −1.8714E−04 | 1.6990E−05 | −9.6110E−07 | 3.0626E−08 | −4.2143E−10 |

In Table 2, k is a conic coefficient, and A4, A6, A8, A10, A12, A14, A16, A18 and A20 are aspherical surface coefficients, r is a vertical distance between a point on an aspherical curve and the optic axis, and z is an aspherical depth (a vertical distance between a point on an aspherical surface, having a distance of r from the optic axis, and a surface tangent to a vertex of the aspherical surface on the optic axis).

$$z = (cr^2)/[1+\{1-(k+1)(c^2r^2)\}^{1/2}] + A4x^4 + A6x^6 + A8x^8 + A10x^{10} + A12x^{12} + A14x^{14} + A16x^{16} + A18x^{18} + A20x^{20} \quad (1)$$

For convenience, an aspherical surface of each lens surface uses the aspherical surfaces represented by the above condition (1). However, the present disclosure is not limited to the aspherical polynomial form represented by the condition (1).

Table 3 shows free-form surface data in the camera optical lens 10 of Embodiment 1 of the present disclosure.

TABLE 3

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −3.1979E−01 | 5.4411E−03 | 1.0468E−02 | 5.4428E−03 | −2.5898E−03 | −6.8102E−03 | −7.6550E−03 | −2.6623E−03 |
| R2 | −8.9817E+01 | −5.6605E−02 | −1.1366E−01 | −5.6820E−02 | 8.1530E−02 | 2.4499E−01 | 2.4535E−01 | 8.1967E−02 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R1 | −1.8000E−02 | −8.0641E−03 | −1.5584E−03 | −7.5759E−04 | −4.3357E−03 | −1.0569E−02 | −1.3636E−02 | −1.0712E−02 |
| R2 | 3.8452E−01 | 1.9310E−01 | 3.8392E−02 | −8.2440E−03 | −4.9524E−02 | −1.2218E−01 | −1.6182E−01 | −1.2119E−01 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R1 | 1.7552E−03 | 6.3277E−03 | 1.0721E−02 | 7.3100E−03 | 1.7676E−03 | −1.6429E−03 | −8.2355E−03 | −1.7589E−02 |
| R2 | −7.9604E−02 | −3.1845E−01 | −4.7719E−01 | −3.1880E−01 | −7.9692E−02 | 3.8732E−02 | 1.9396E−01 | 3.8510E−01 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R1 | −4.7059E−03 | −7.9702E−04 | 0.0000E+00 | 0.0000E+00 | 0.0000E+00 | 0.0000E+00 | 0.0000E+00 | 0.0000E+00 |
| R2 | −4.8960E−02 | −8.0400E−03 | 0.0000E+00 | 0.0000E+00 | 0.0000E+00 | 0.0000E+00 | 0.0000E+00 | 0.0000E+00 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

$$z = \frac{cr^2}{1 + \sqrt{1 - (1+k)c^2r^2}} + \sum_{i=1}^{N} B_i E_i(x, y) \quad (2)$$

In the above equation, k is a conic coefficient, Bi is an aspherical coefficient, r is a vertical distance between a point on a free-form surface and an optic axis, x is an x-direction component of r, y is a y-direction component of r, and z is an aspherical depth (a vertical distance between a point on an aspherical surface at a distance of r from the optic axis and a tangent plane tangent to a vertex on an aspherical optic axis).

In the above equation, k is a conic coefficient, Bi is an aspherical coefficient, r is a vertical distance between a point on a free-form surface and an optic axis, x is an x-direction component of r, y is a y-direction component of r, and z is an aspherical depth (a vertical distance between a point on an aspherical surface at a distance of r from the optic axis and a tangent plane tangent to a vertex on an aspherical optic axis).

For convenience, each free-form surface uses an extended polynomial surface represented by the above formula (2). However, the present disclosure is not limited to the free-form surface polynomial form represented by the formula (2).

Figure 2:
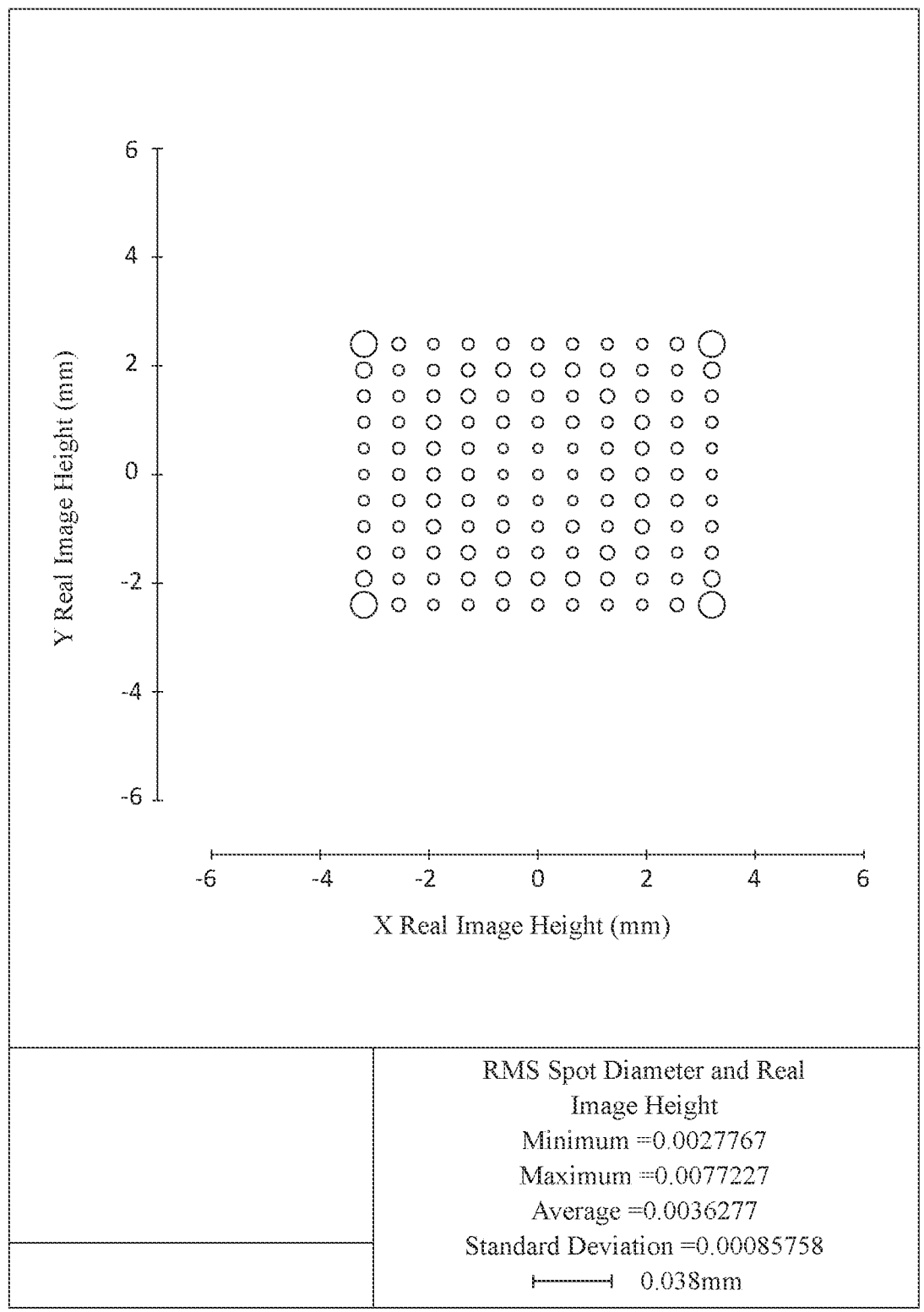
FIG. 2 is diagram showing a case where an RMS spot diameter of a camera optical lens shown in FIG. 1 is within a first quadrant.
Figure 3:
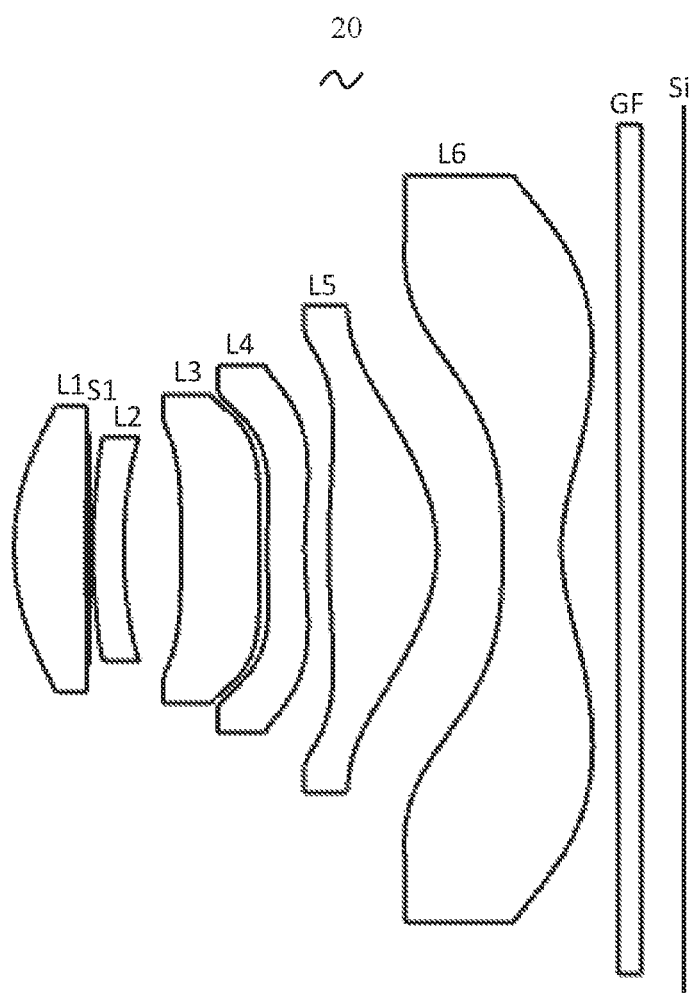
FIG. 3 is a structural schematic diagram of a camera optical lens in accordance with Embodiment 2 of the present disclosure.

FIG. 2 shows a case where an RMS spot diameter of the camera optical lens 10 of Embodiment 1 is within a first quadrant. According to FIG. 2, it can be known that the camera optical lens 10 of Embodiment 1 can achieve good imaging quality.

Table 16 below further lists various values of Embodiment 1, Embodiment 2, Embodiment 3, Embodiment 4, and Embodiment 5, and values corresponding to parameters which are specified in the above conditions.

As shown in Table 16, Embodiment 1 satisfies the respective conditions.

As an example, the entrance pupil diameter ENPD of the camera optical lens is 2.298 mm, the image height (along a diagonal direction) IH is 8.000 mm, an image height in an x direction is 6.400 mm, an image height in a y direction is 4.800 mm, and the imaging effect is the best in the rectangular range. The field of view (FOV) along a diagonal direction is 84.99°, an FOV in the x direction is 73.67°, and an FOV in the y direction is 58.44°. Thus, the camera optical lens 10 satisfies design requirements of ultra-thin and wide-angle while the on-axis and off-axis aberrations are sufficiently corrected, thereby leading to better optical characteristics.

Embodiment 2

Embodiment 2 is basically the same as Embodiment 1 and involves symbols having the same meanings as Embodiment 1. Only differences therebetween will be described in the following.

Table 4 and Table 5 show design data of a camera optical lens 20 in Embodiment 2 of the present disclosure. The object-side surface and the image-side surface of the second lens L2 are free-form surfaces.

TABLE 4

|  | R | d |  | nd |  | vd |
|---|---|---|---|---|---|---|
| S1 | ∞ | d0= | −0.662 |  |  |  |
| R1 | 2.286 | d1= | 0.632 | nd1 | 1.5444 | v1 | 55.82 |
| R2 | 13.782 | d2= | 0.060 |  |  |  |
| R3 | 4.910 | d3= | 0.270 | nd2 | 1.6800 | v2 | 18.40 |
| R4 | 3.590 | d4= | 0.511 |  |  |  |
| R5 | −16.831 | d5= | 0.684 | nd3 | 1.5444 | v3 | 55.82 |
| R6 | 6.593 | d6= | 0.074 |  |  |  |
| R7 | 3.152 | d7= | 0.330 | nd4 | 1.6800 | v4 | 18.40 |
| R8 | 2.697 | d8= | 0.213 |  |  |  |
| R9 | 5.256 | d9= | 0.953 | nd5 | 1.5444 | v5 | 55.82 |
| R10 | −1.488 | d10= | 0.582 |  |  |  |
| R11 | −9.306 | d11= | 0.515 | nd6 | 1.5438 | v6 | 56.03 |
| R12 | 1.654 | d12= | 0.500 |  |  |  |
| R13 | ∞ | d13= | 0.210 | ndg | 1.5168 | vg | 64.17 |
| R14 | ∞ | d14= | 0.367 |  |  |  |

Table 5 shows aspherical surface data of respective lenses in the camera optical lens 20 according to Embodiment 2 of the present disclosure.

TABLE 5

|  | Conic coefficient | Aspherical coefficient | | | |
|---|---|---|---|---|---|
|  | k | A4 | A6 | A8 | A10 |
| R1 | −3.7373E−01 | 2.4243E−03 | 1.3562E−02 | −3.1531E−02 | 3.3609E−02 |
| R2 | 1.4471E+01 | −3.2732E−02 | 9.1242E−03 | 6.0780E−02 | −1.5463E−01 |
| R5 | 8.4342E+01 | −4.2286E−02 | 2.7996E−02 | −1.7559E−01 | 2.8516E−01 |
| R6 | 1.3473E+01 | −4.4670E−01 | 1.2063E+00 | −2.5360E+00 | 3.3110E+00 |
| R7 | −5.3283E+01 | −4.5208E−01 | 1.0541E+00 | −1.8954E+00 | 2.0058E+00 |
| R8 | −3.8268E+01 | −2.5250E−01 | 4.7587E−01 | −7.3680E−01 | 7.1736E−01 |
| R9 | −1.8893E+01 | −1.3659E−01 | 2.2415E−01 | −2.3297E−01 | 1.4560E−01 |
| R10 | −2.7819E+00 | −1.4864E−02 | −1.7749E−02 | 4.7163E−02 | −3.9813E−02 |
| R11 | 4.6421E+00 | −1.0735E−01 | 5.9756E−02 | −2.9939E−02 | 1.0516E−02 |
| R12 | −7.0670E+00 | −4.7035E−02 | 1.6092E−02 | −4.3860E−03 | 8.1035E−04 |

|  | Aspherical coefficient | | | | |
|---|---|---|---|---|---|
|  | A12 | A14 | A16 | A18 | A20 |
| R1 | −1.9431E−02 | 3.8532E−03 | 0.0000E+00 | 0.0000E+00 | 0.0000E+00 |
| R2 | 1.5283E−01 | −7.1847E−02 | 1.3339E−02 | 0.0000E+00 | 0.0000E+00 |
| R5 | −2.3409E−01 | 7.5428E−02 | 0.0000E+00 | 0.0000E+00 | 0.0000E+00 |
| R6 | −2.7713E+00 | 1.4456E+00 | −4.4339E−01 | 7.0375E−02 | −3.9701E−03 |
| R7 | −1.2194E+00 | 3.4821E−01 | 8.0887E−03 | −2.8069E−02 | 4.6045E−03 |

TABLE 5-continued

| | | | | |
|---|---|---|---|---|
| R8 | −4.5421E−01 | 1.8901E−01 | −5.0402E−02 | 7.8561E−03 −5.4113E−04 |
| R9 | −5.7541E−02 | 1.4400E−02 | −2.2462E−03 | 2.0759E−04 −9.1176E−06 |
| R10 | 1.7964E−02 | −4.6536E−03 | 6.9225E−04 | −5.4968E−05 1.8023E−06 |
| R11 | −2.2455E−03 | 2.9162E−04 | −2.2734E−05 | 9.8350E−07 −1.8222E−08 |
| R12 | −1.0110E−04 | 8.3526E−06 | −4.4226E−07 | 1.4051E−08 −2.1199E−10 |

Table 6 shows free-form surface data in the camera optical lens 20 of Embodiment 2 of the present disclosure.

An optical element such as an optical filter (GF) may be provided between the sixth lens L6 and an image surface Si.

TABLE 6

| Free-form surface coefficient | | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R3 | −1.5648E+01 | −3.2058E−02 | −6.4313E−02 | −3.1998E−02 | 2.6129E−02 | 8.0783E−02 | 8.0253E−02 | 2.6110E−02 |
| R4 | −4.4910E+00 | −1.7017E−02 | −3.4792E−02 | −1.7020E−02 | 3.0169E−02 | 9.4677E−02 | 9.2725E−02 | 3.0510E−02 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R3 | −7.0874E−01 | −3.5398E−01 | −7.1073E−02 | 6.0798E−02 | 3.7049E−01 | 9.2789E−01 | 1.2509E+00 | 9.1705E−01 |
| R4 | 1.2966E+00 | 6.4880E−01 | 1.2964E−01 | −1.2074E−01 | −7.1702E−01 | −1.7884E+00 | −2.3800E+00 | −1.7952E+00 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R3 | −1.1050E−01 | −1.5262E−02 | 0.0000E+00 | 0.0000E+00 | 0.0000E+00 | 0.0000E+00 | 0.0000E+00 | 0.0000E+00 |
| R4 | 3.3800E−01 | 4.8570E−02 | 0.0000E+00 | 0.0000E+00 | 0.0000E+00 | 0.0000E+00 | 0.0000E+00 | 0.0000E+00 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R3 | 0.0000E+00 | 0.0000E+00 | 0.0000E+00 | 0.0000E+00 | 0.0000E+00 | 0.0000E+00 | 0.0000E+00 | 0.0000E+00 |
| R4 | 0.0000E+00 | 0.0000E+00 | 0.0000E+00 | 0.0000E+00 | 0.0000E+00 | 0.0000E+00 | 0.0000E+00 | 0.0000E+00 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R3 | 2.6535E−02 | 1.0115E−01 | 1.5208E−01 | 1.0362E−01 | 2.6512E−02 | −7.0937E−02 | −3.5431E−01 | −7.0991E−01 |
| R4 | −6.5307E−02 | −2.6867E−01 | −4.0097E−01 | −2.6266E−01 | −6.5948E−02 | 1.2973E−01 | 6.4959E−01 | 1.3001E+00 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R3 | 3.6796E−01 | 6.0780E−02 | −1.5389E−02 | −1.1109E−01 | −3.3547E−01 | −5.6605E−01 | −5.6804E−01 | −3.2534E−01 |
| R4 | −7.2213E−01 | −1.2029E−01 | 4.8659E−02 | 3.3594E−01 | 1.0006E+00 | 1.6679E+00 | 1.6623E+00 | 1.0117E+00 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R3 | 0.0000E+00 | 0.0000E+00 | 0.0000E+00 | 0.0000E+00 | 0.0000E+00 | 0.0000E+00 | 0.0000E+00 | 0.0000E+00 |
| R4 | 0.0000E+00 | 0.0000E+00 | 0.0000E+00 | 0.0000E+00 | 0.0000E+00 | 0.0000E+00 | 0.0000E+00 | 0.0000E+00 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R3 | 0.0000E+00 | 0.0000E+00 | 0.0000E+00 | 0.0000E+00 | 0.0000E+00 | 0.0000E+00 | 0.0000E+00 | 0.0000E+00 |
| R4 | 0.0000E+00 | 0.0000E+00 | 0.0000E+00 | 0.0000E+00 | 0.0000E+00 | 0.0000E+00 | 0.0000E+00 | 0.0000E+00 |

Figure 4:
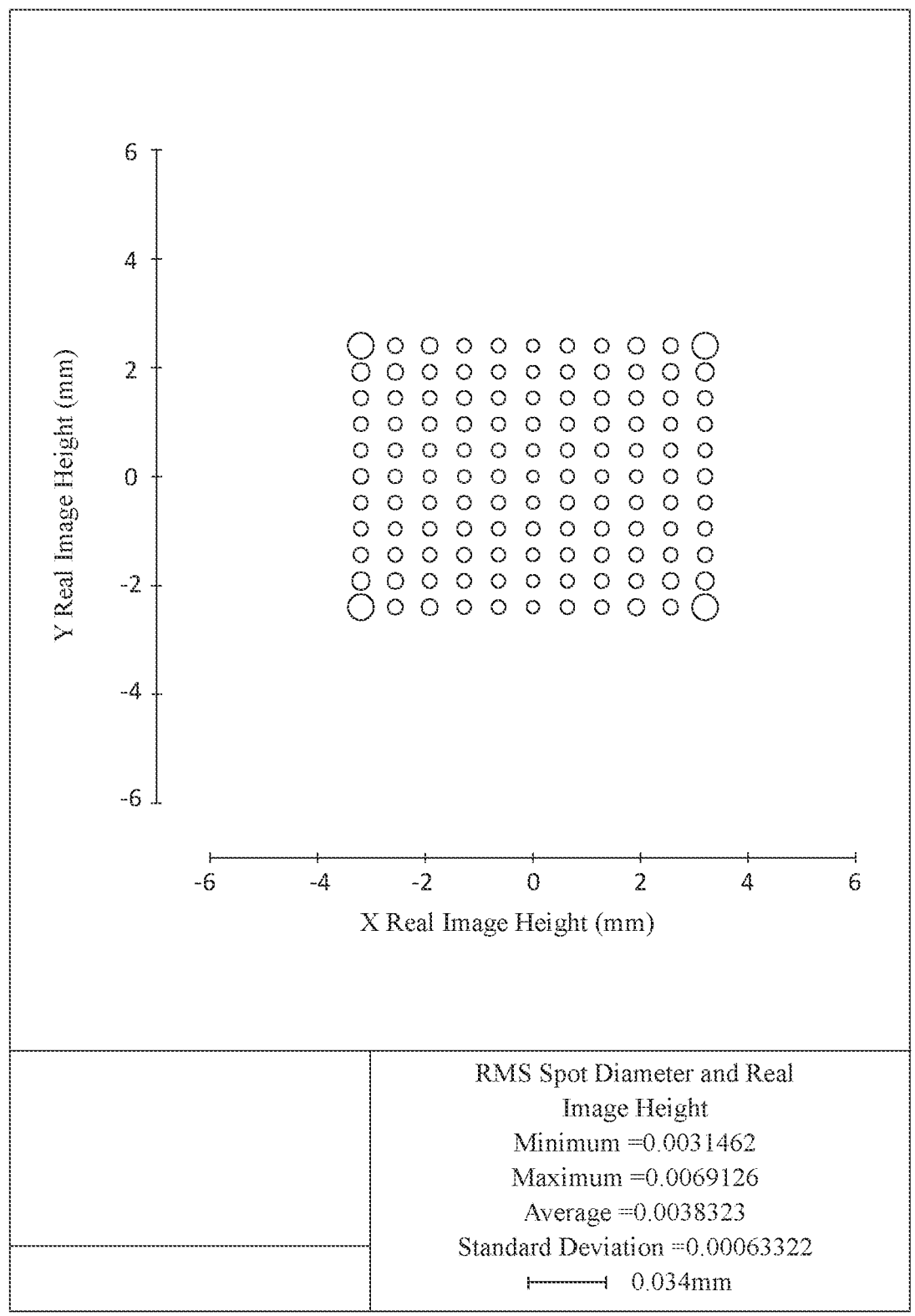
FIG. 4 is diagram showing a case where an RMS spot diameter of a camera optical lens shown in FIG. 3 is within a first quadrant.
Figure 5:
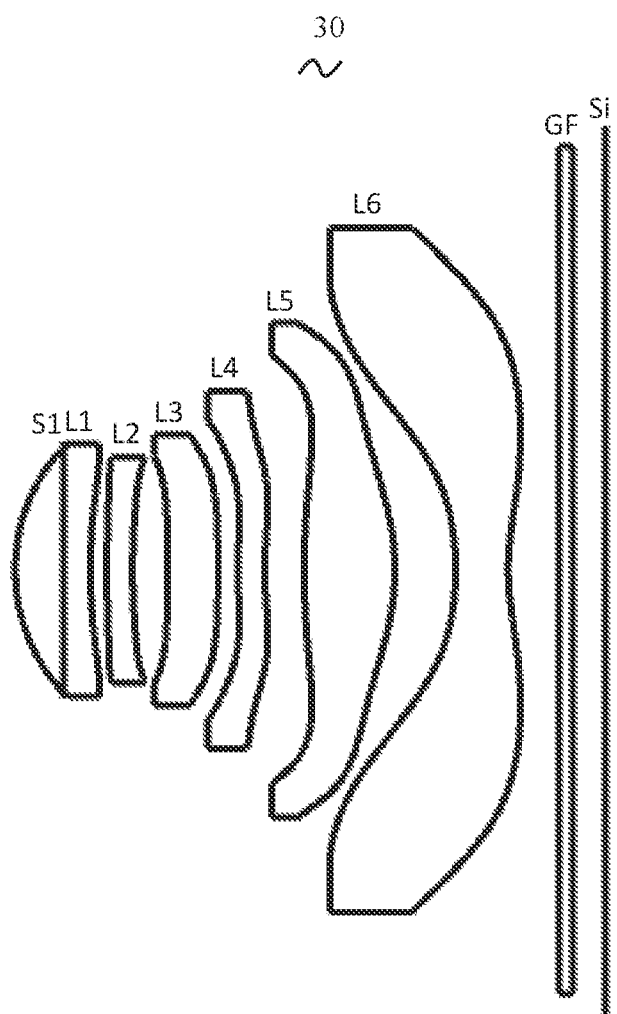
FIG. 5 is a structural schematic diagram of a camera optical lens in accordance with Embodiment 3 of the present disclosure.

FIG. 4 shows a situation where an RMS spot diameter of the camera optical lens 20 of Embodiment 2 is within a first quadrant. According to FIG. 4, it can be known that the camera optical lens 20 of Embodiment 2 can achieve good imaging quality.

As shown in Table 16, Embodiment 2 satisfies the respective conditions.

In this embodiment, the entrance pupil diameter ENPD of the camera optical lens is 2.291 mm. The image height (along a diagonal direction) IH is 8.000 mm, an image height in the x direction is 6.400 mm, an image height in the y direction is 4.800 mm, and the imaging effect is the best in this rectangular range. The FOV along a diagonal direction is 85.56°, an FOV in the x direction is 73.84°, and an FOV in the y direction is 58.53°. Thus, the camera optical lens 20 satisfies design requirements of ultra-thin and wide-angle while the on-axis and off-axis aberrations are sufficiently corrected, thereby leading to better optical characteristics.

Embodiment 3

Embodiment 3 is basically the same as Embodiment 1 and involves symbols having the same meanings as Embodiment 1. Only differences therebetween will be described in the following.

A camera optical lens 30 in the present embodiment includes an aperture S1, a first lens L1, a second lens L2, a third lens L3, a fourth lens L4, a fifth lens L5, and a sixth lens L6 successively from an object side to an image side.

An image-side surface of the third lens L3 is convex at a paraxial position.

Table 7 and Table 8 show design data of a camera optical lens 30 in Embodiment 3 of the present disclosure.

TABLE 7

| | R | d | | nd | | vd |
|---|---|---|---|---|---|---|
| S1 | ∞ | d0= | −0.411 | | | |
| R1 | 1.666 | d1= | 0.640 | nd1 | 1.5357 | v1 74.64 |
| R2 | 4.357 | d2= | 0.141 | | | |
| R3 | 8.311 | d3= | 0.220 | nd2 | 1.6700 | v2 19.39 |
| R4 | 6.010 | d4= | 0.295 | | | |
| R5 | −37.312 | d5= | 0.431 | nd3 | 1.5444 | v3 55.82 |
| R6 | −45.540 | d6= | 0.171 | | | |
| R7 | 3.491 | d7= | 0.227 | nd4 | 1.6153 | v4 25.94 |
| R8 | 2.756 | d8= | 0.337 | | | |
| R9 | 6.241 | d9= | 0.774 | nd5 | 1.5444 | v5 55.82 |
| R10 | −2.058 | d10= | 0.516 | | | |
| R11 | −3.016 | d11= | 0.450 | nd6 | 1.5444 | v6 55.82 |
| R12 | 2.246 | d12= | 0.437 | | | |
| R13 | ∞ | d13= | 0.110 | ndg | 1.5168 | vg 64.17 |
| R14 | ∞ | d14= | 0.279 | | | |

Table 8 shows aspherical surface data of respective lenses in the camera optical lens 30 according to Embodiment 3 of the present disclosure.

TABLE 8

| | Conic coefficient | Aspherical coefficient | | | |
|---|---|---|---|---|---|
| | k | A4 | A6 | A8 | A10 |
| R3 | 1.9373E+01 | −8.2478E−02 | 4.2072E−02 | 9.0164E−02 | −4.1451E−01 |
| R4 | 2.7633E+01 | −5.8575E−02 | 1.6042E−02 | 2.2855E−01 | −1.1149E+00 |
| R5 | 7.2955E+02 | −6.0902E−02 | 1.1917E−01 | −8.1118E−01 | 2.1829E+00 |
| R6 | 9.8753E+02 | −1.7514E−01 | 2.7224E−01 | −5.1938E−01 | 5.9951E−01 |
| R7 | −9.1054E+01 | −2.7963E−01 | 1.6030E−01 | 1.7095E−01 | −8.5286E−01 |
| R8 | −4.3460E+01 | −1.8150E−01 | −1.0572E−01 | 2.5188E−01 | −4.4083E−01 |
| R9 | −3.9985E+01 | 9.2438E−03 | −4.8553E−02 | 6.6453E−02 | −6.1794E−02 |
| R10 | −1.2057E+00 | 7.9827E−02 | −6.4007E−02 | 7.2893E−02 | −5.1586E−02 |
| R11 | −7.7428E−01 | −1.4164E−01 | 7.9410E−02 | −2.3883E−02 | 5.1708E−03 |
| R12 | −1.3861E+01 | −9.0573E−02 | 5.3614E−02 | −2.4901E−02 | 8.1601E−03 |

| | Aspherical coefficient | | | | |
|---|---|---|---|---|---|
| | A12 | A14 | A16 | A18 | A20 |
| R3 | 9.4414E−01 | −1.1869E+00 | 8.5396E−01 | −3.2217E−01 | 4.8187E−02 |
| R4 | 3.4382E+00 | −6.4362E+00 | 7.0855E+00 | −4.2043E+00 | 1.0422E+00 |
| R5 | −3.1052E+00 | 1.6651E+00 | 1.0014E+00 | −1.7048E+00 | 6.2131E−01 |
| R6 | −3.2216E−01 | −2.5114E−01 | 5.5896E−01 | −3.5749E−01 | 8.1982E−02 |
| R7 | 1.4375E+00 | −1.3359E+00 | 7.3120E−01 | −2.2217E−01 | 2.8846E−02 |
| R8 | 4.2629E−01 | −2.3603E−01 | 7.4228E−02 | −1.2384E−02 | 8.5372E−04 |
| R9 | 3.6008E−02 | −1.3117E−02 | 2.8232E−03 | −3.2537E−04 | 1.5601E−05 |
| R10 | 2.2578E−02 | −6.4534E−03 | 1.1714E−03 | −1.2200E−04 | 5.5315E−06 |
| R11 | −8.1021E−04 | 8.7669E−05 | −6.1647E−06 | 2.5495E−07 | −4.7810E−09 |
| R12 | −1.8159E−03 | 2.6085E−04 | −2.2862E−05 | 1.1066E−06 | −2.2625E−08 |

Table 9 shows free-form surface data in the camera optical lens 30 of Embodiment 3 of the present disclosure.

TABLE 9

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −4.3799E−02 | 4.0888E−03 | 7.7638E−03 | 4.0032E−03 | 1.0428E−02 | 3.1331E−02 | 3.1039E−02 | 1.0410E−02 |
| R2 | 1.0070E+01 | −6.1686E−02 | −1.2365E−01 | −6.1751E−02 | 6.0877E−02 | 1.8396E−01 | 1.8200E−01 | 6.0997E−02 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R1 | 8.0889E−01 | 4.0386E−01 | 8.0643E−01 | −1.4197E−01 | −8.5391E−01 | −2.1402E+00 | −2.8460E+00 | −2.1358E+00 |
| R2 | 9.5156E−02 | 4.8071E−02 | 9.4884E−03 | 4.3395E−01 | 2.5996E+00 | 6.5026E+00 | 8.6710E+00 | 6.5138E+00 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R1 | 1.0406E+00 | 1.4801E−01 | −8.9865E−02 | −7.1937E−01 | −2.5205E+00 | −5.0224E+00 | −6.2874E+00 | −5.0298E+00 |
| R2 | −5.7030E+00 | −8.1404E−01 | 6.9396E−01 | 5.5490E+00 | 1.9376E+01 | 3.8825E+01 | 4.8634E+01 | 3.8811E+01 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R1 | 3.6705E+00 | 2.4442E+00 | 1.0493E+00 | 2.6268E−01 | 2.9209E−02 | −4.0681E−03 | −4.0272E−02 | −1.8806E−01 |
| R2 | −3.6834E+01 | −2.4606E+01 | −1.0492E+01 | −2.6293E+00 | −2.9293E−01 | 4.9352E−02 | 4.9593E−01 | 2.2936E+00 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R1 | −2.8316E−02 | −1.1254E−01 | −1.6988E−01 | −1.1243E−01 | −2.8298E−02 | 8.0624E−01 | 4.0429E−01 | 8.0607E−01 |
| R2 | −1.3616E−01 | −5.4226E−01 | −8.1861E−01 | −5.4329E−01 | −1.3605E−01 | 9.4391E−03 | 4.8857E−02 | 9.0673E−02 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R1 | −8.5415E−01 | −1.4196E−01 | 1.4802E−01 | 1.0402E+00 | 3.1099E+00 | 5.1955E+00 | 5.1938E+00 | 3.1155E+00 |
| R2 | 2.5982E+00 | 4.3393E−01 | −8.1395E−01 | −5.7014E+00 | −1.7112E+01 | −2.8488E+01 | −2.8491E+01 | −1.7086E+01 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R1 | −2.5136E+00 | −7.1879E−01 | −8.9898E−02 | 2.9185E−02 | 2.6247E−01 | 1.0468E+00 | 2.4624E+00 | 3.6796E+00 |
| R2 | 1.9411E+01 | 5.5478E+00 | 6.9402E−01 | −2.9298E−01 | −2.6294E+00 | −1.0512E+01 | −2.4576E+01 | −3.6822E+01 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R1 | −4.6319E−01 | −8.5261E−01 | −1.0447E+00 | −8.7890E−01 | −4.9428E−01 | −1.9329E−01 | −4.1019E−02 | −4.0493E−03 |
| R2 | 5.8783E+00 | 1.0522E+01 | 1.2555E+01 | 1.0501E+01 | 5.8023E+00 | 2.2237E+00 | 4.9827E−01 | 4.9427E−02 |

Figure 6:
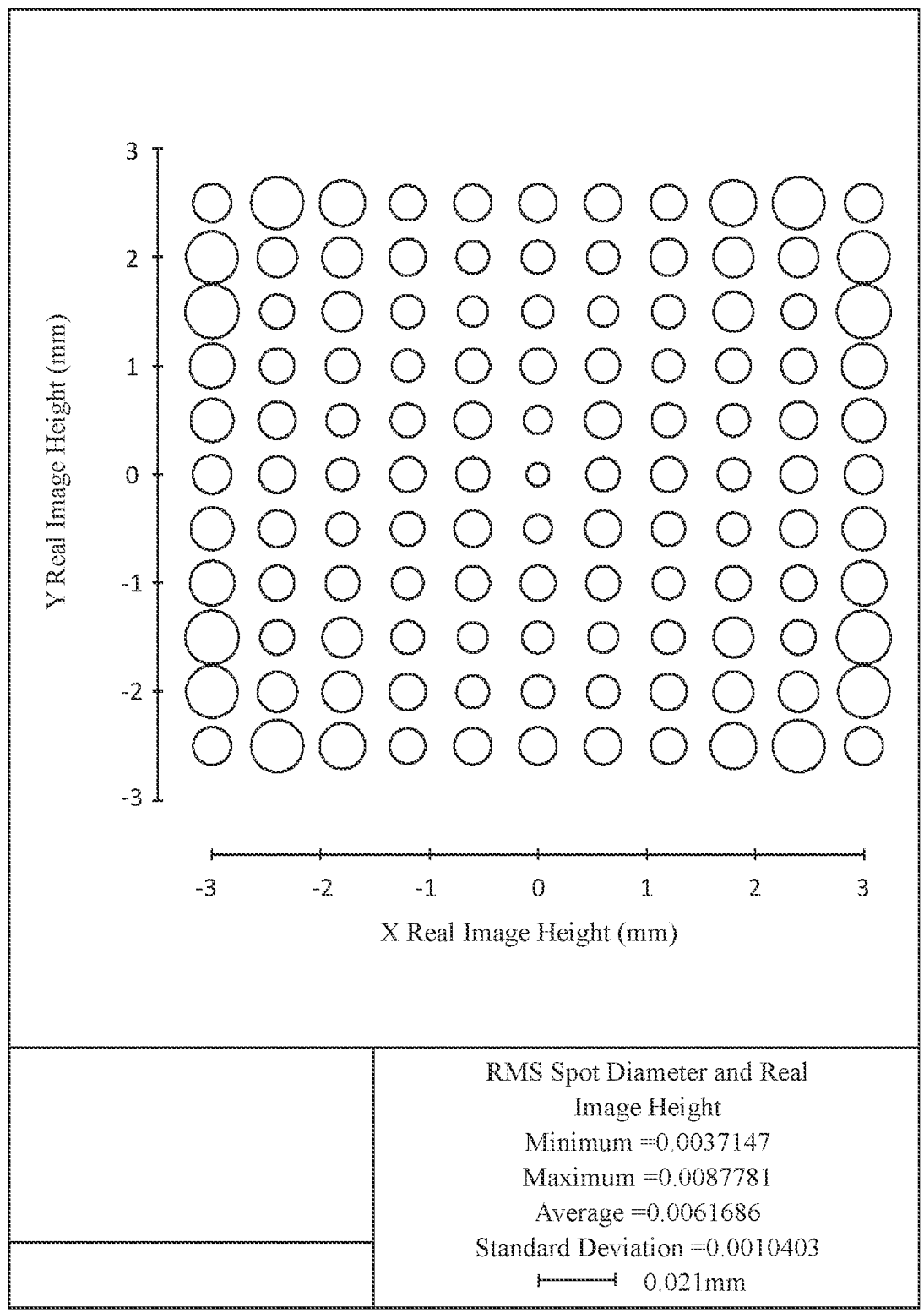
FIG. 6 is diagram showing a case where an RMS spot diameter of a camera optical lens shown in FIG. 5 is within a first quadrant.
Figure 7:
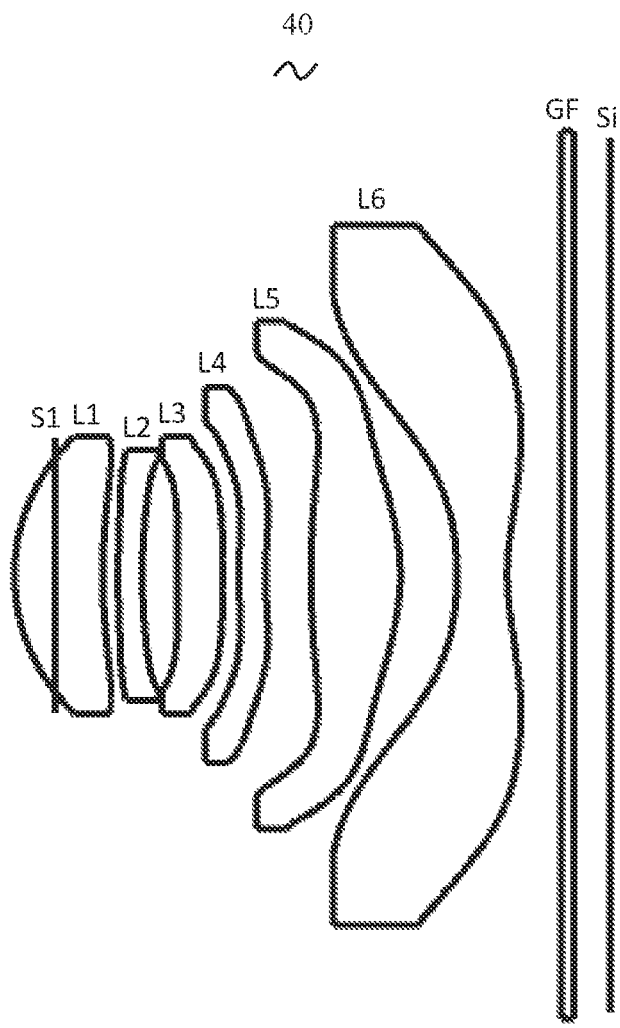
FIG. 7 is a structural schematic diagram of a camera optical lens in accordance with Embodiment 4 of the present disclosure.

FIG. 6 shows a situation where an RMS spot diameter of the camera optical lens 30 of Embodiment 3 is within a first quadrant. According to FIG. 6, it can be known that the camera optical lens 30 of Embodiment 3 can achieve good imaging quality.

Table 16 below further lists values corresponding to various conditions in the present embodiment according to the above conditions. The camera optical lens according to the present embodiment satisfies the above conditions.

In this embodiment, the entrance pupil diameter ENPD of the camera optical lens is 2.233 mm. The image height (along a diagonal direction) IH is 7.810 mm, an image height in the x direction is 6.000 mm, an image height in the y direction is 5.000 mm, and the imaging effect is the best in this rectangular range. The FOV along a diagonal direction is 85.51°, an FOV in the x direction is 71.36°, and an FOV in the y direction is 61.65°. Thus, the camera optical lens 30 satisfies design requirements of ultra-thin and wide-angle while the on-axis and off-axis aberrations are sufficiently corrected, thereby leading to better optical characteristics.

Embodiment 4

Embodiment 4 is basically the same as Embodiment 1 and involves symbols having the same meanings as Embodiment 1. Only differences therebetween will be described in the following.

A camera optical lens 40 in the present embodiment includes an aperture S1, a first lens L1, a second lens L2, a third lens L3, a fourth lens L4, a fifth lens L5, and a sixth lens L6 successively from an object side to an image side. An optical element such as an optical filter (GF) may be provided between the sixth lens L6 and an image surface Si.

An image-side surface of the third lens L3 is convex at a paraxial position.

Table 10 and Table 11 show design data of a camera optical lens 40 in Embodiment 4 of the present disclosure. The object-side surface and image-side surface of the sixth lens L6 are free-form surfaces.

TABLE 10

|  | R | d |  | nd |  | vd |
|---|---|---|---|---|---|---|
| S1 | ∞ | d0= | −0.349 |  |  |  |
| R1 | 1.748 | d1= | 0.758 | nd1 | 1.5357 | v1 74.64 |
| R2 | 4.550 | d2= | 0.136 |  |  |  |
| R3 | 7.380 | d3= | 0.209 | nd2 | 1.6700 | v2 19.39 |

TABLE 10-continued

|  | R | d |  | nd |  | vd |
|---|---|---|---|---|---|---|
| R4 | 5.258 | d4= | 0.305 |  |  |  |
| R5 | −75.183 | d5= | 0.386 | nd3 | 1.5444 | v3 55.82 |
| R6 | −117.196 | d6= | 0.139 |  |  |  |
| R7 | 3.534 | d7= | 0.229 | nd4 | 1.6153 | v4 25.94 |
| R8 | 3.094 | d8= | 0.390 |  |  |  |
| R9 | 6.601 | d9= | 0.771 | nd5 | 1.5444 | v5 55.82 |
| R10 | −2.054 | d10= | 0.485 |  |  |  |
| R11 | −3.401 | d11= | 0.434 | nd6 | 1.5444 | v6 55.82 |
| R12 | 2.128 | d12= | 0.462 |  |  |  |
| R13 | ∞ | d13= | 0.110 | ndg | 1.5168 | vg 64.17 |
| R14 | ∞ | d14= | 0.315 |  |  |  |

Table 11 shows aspherical surface data of respective lenses in the camera optical lens 40 according to Embodiment 4 of the present disclosure.

TABLE 11

|  | Conic coefficient | Aspherical coefficient | | | |
|---|---|---|---|---|---|
|  | k | A4 | A6 | A8 | A10 |
| R1 | −2.1581E−01 | 7.4888E−03 | 5.0196E−03 | −2.5666E−02 | 8.1547E−02 |
| R2 | 8.3848E+00 | −6.6879E−02 | 6.5398E−02 | −1.3683E−01 | 1.1780E−02 |
| R3 | −5.2556E+00 | −8.8735E−02 | 4.0398E−02 | 1.0591E−01 | −4.0845E−01 |
| R4 | 2.2147E+01 | −6.8777E−02 | 9.9446E−03 | 2.3382E−01 | −1.1083E+00 |
| R5 | 4.7659E+03 | −6.4343E−01 | 1.1800E−01 | −8.1600E−01 | 2.1806E+00 |
| R6 | 5.0001E+03 | −1.8238E−01 | 2.6558E−01 | −5.1721E−01 | 6.0026E−01 |
| R7 | −7.6769E+01 | −2.8378E−01 | 1.6368E−01 | 1.7308E−01 | −8.5301E−01 |
| R8 | −5.2722E+01 | −1.8502E−01 | −1.1373E−02 | 2.5163E−01 | −4.4092E−01 |
| R9 | −3.8287E+01 | 1.0135E−02 | −4.8598E−02 | 6.6054E−02 | −6.1848E−02 |
| R10 | −1.3738E+00 | 8.0829E−02 | −6.4362E−02 | 7.2669E−02 | −5.1599E−02 |

|  | Aspherical coefficient | | | | |
|---|---|---|---|---|---|
|  | A12 | A14 | A16 | A18 | A20 |
| R1 | −1.4291E−01 | 1.4806E−01 | −8.9839E−02 | 2.9276E−02 | −4.0012E−03 |
| R2 | 4.3811E−01 | −8.1121E−01 | 6.9296E−01 | −2.9534E−01 | 4.8666E−02 |
| R3 | 9.4118E−01 | −1.1919E+00 | 8.5114E−01 | −3.2223E−01 | 4.8541E−02 |
| R4 | 3.4374E+00 | −6.4395E+00 | 7.0803E+00 | −4.2075E+00 | 1.0419E+00 |
| R5 | −3.1054E+00 | 1.6646E+00 | 1.0053E+00 | −1.7036E+00 | 6.1658E−01 |
| R6 | −3.2281E−01 | −2.5180E−01 | 5.5880E−01 | −3.5764E−01 | 8.1826E−02 |
| R7 | 1.4373E+00 | −1.3360E+00 | 7.3124E−01 | −2.2217E−01 | 2.8794E−02 |
| R8 | 4.2624E−01 | −2.3605E−01 | 7.4227E−02 | −1.2384E−02 | 8.5413E−04 |
| R9 | 3.5987E−02 | −1.3125E−02 | 2.8217E−03 | −3.2516E−04 | 1.5893E−05 |
| R10 | 2.2582E−02 | −6.4525E−03 | 1.1715E−03 | −1.2201E−04 | 5.5259E−06 |

Table 12 shows free-form surface data in the camera optical lens 40 of Embodiment 4 of the present disclosure.

TABLE 12

| Free-form surface coefficient | | | | | | | | |
|---|---|---|---|---|---|---|---|---|
|  | k | $X^4Y^0$ | $X^2Y^2$ | $X^0Y^4$ | $X^6Y^0$ | $X^4Y^2$ | $X^2Y^4$ | $X^0Y^6$ |
| R11 | −3.9500E−01 | −1.4414E−01 | −2.8809E−01 | −1.4394E−01 | 7.9547E−02 | 2.3817E−01 | 2.3778E−01 | 7.9306E−02 |
| R12 | −1.2400E+01 | −9.0912E−02 | −1.8179E−01 | −9.0565E−02 | 5.3720E−02 | 1.6119E−01 | 1.6096E−01 | 5.3579E−02 |
|  | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R11 | 5.1748E−02 | 2.5939E−02 | 5.1718E−03 | −8.1073E−04 | −4.8619E−03 | −1.2200E−02 | −1.6205E−02 | −1.2181E−02 |
| R12 | 8.1620E−02 | 4.0803E−02 | 8.1621E−03 | −1.8155E−03 | −1.0896E−02 | −2.7235E−02 | −3.6318E−02 | −2.7237E−02 |
|  | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R11 | 6.1341E−04 | 8.7739E−05 | −6.2234E−06 | −4.9274E−05 | −1.7201E−04 | −3.4481E−04 | −4.3205E−04 | −3.4466E−04 |
| R12 | 1.8260E−03 | 2.6084E−04 | −2.2869E−05 | −1.8288E−04 | −6.4013E−04 | −1.2803E−03 | −1.6004E−03 | −1.2802E−03 |
|  | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R11 | 3.2183E−05 | 2.1431E−05 | 9.2261E−06 | 2.2847E−06 | 2.5468E−07 | −2.1689E−09 | −5.6368E−08 | −2.2603E−07 |
| R12 | 1.3943E−04 | 9.2960E−05 | 3.9836E−05 | 9.9617E−06 | 1.1064E−06 | −2.2531E−08 | −2.2659E−07 | −1.0188E−06 |

TABLE 12-continued

| | | | | Free-form surface coefficient | | | | |
|---|---|---|---|---|---|---|---|---|
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R11 | −2.3822E−02 | −9.5557E−02 | −1.4302E−01 | −9.5376E−02 | −2.3862E−02 | 5.1761E−03 | 2.5896E−02 | 5.1826E−02 |
| R12 | −2.4884E−02 | −9.9532E−02 | −1.4939E−01 | −9.9510E−02 | −2.4888E−02 | 8.1640E−03 | 4.0799E−02 | 8.1613E−02 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R11 | −4.8635E−03 | −8.1030E−04 | 8.7196E−05 | 6.1408E−04 | 1.8427E−03 | 3.0689E−03 | 3.0708E−03 | 1.8432E−03 |
| R12 | −1.0895E−02 | −1.8158E−03 | 2.6083E−04 | 1.8260E−03 | 5.4779E−03 | 9.1302E−03 | 9.1301E−03 | 5.4780E−03 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R11 | −1.7301E−04 | −4.9475E−05 | −6.1680E−06 | 2.5428E−07 | 2.3210E−06 | 9.2572E−06 | 2.1355E−05 | 3.2275E−05 |
| R12 | −6.4015E−04 | −1.8288E−04 | −2.2864E−05 | 1.1059E−06 | 9.9606E−06 | 3.9839E−05 | 9.2954E−05 | 1.3943E−04 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R11 | −5.8291E−07 | −1.0384E−06 | −1.2166E−06 | −1.0311E−06 | −5.7897E−07 | −2.2038E−07 | −4.3870E−08 | −4.8186E−09 |
| R12 | −2.7149E−06 | −4.7504E−06 | −5.7035E−06 | −4.7515E−06 | −2.7162E−06 | −1.0193E−06 | −2.2651E−07 | −2.2600E−08 |

Figure 8:
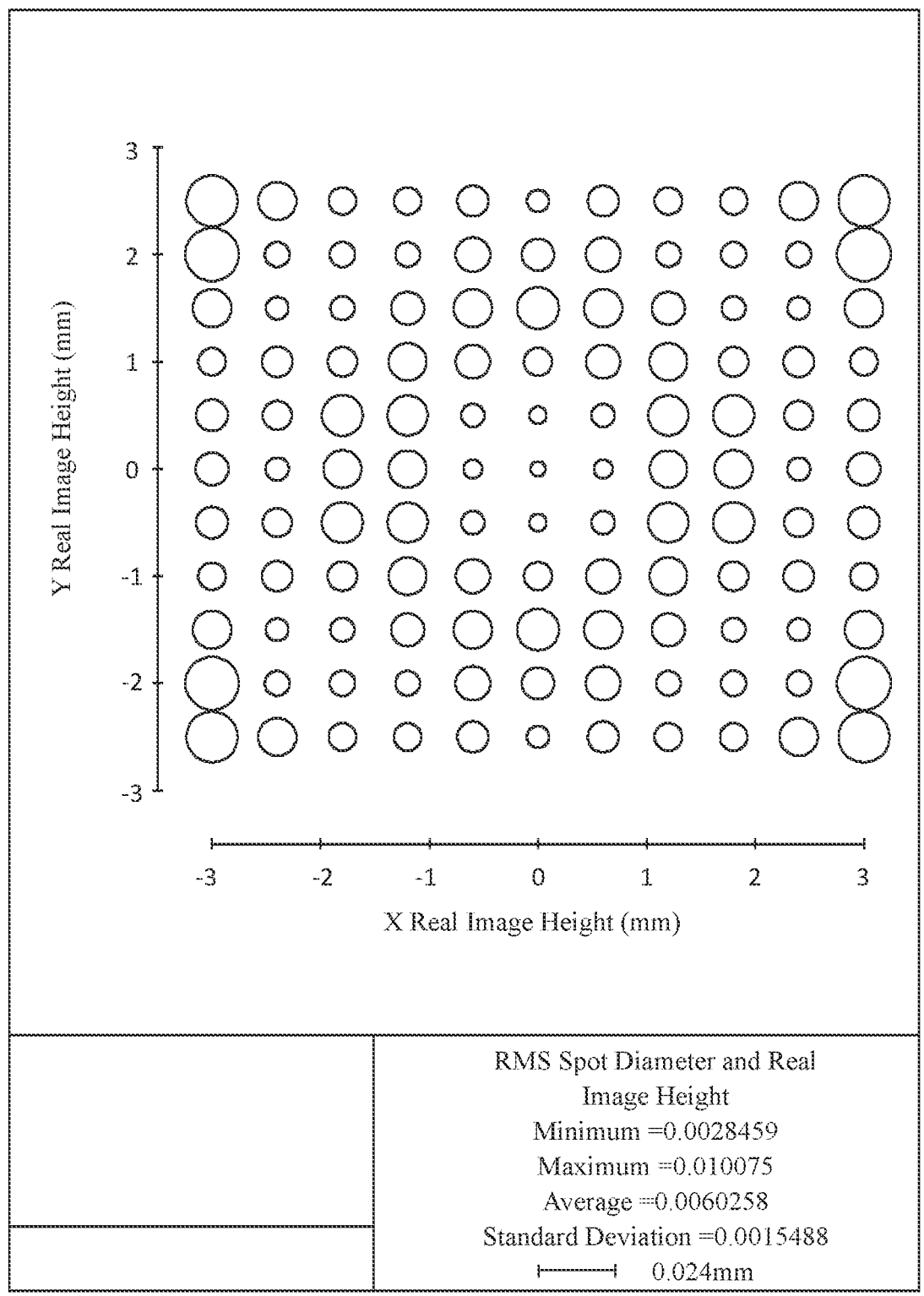
FIG. 8 is diagram showing a case where an RMS spot diameter of a camera optical lens shown in FIG. 7 is within a first quadrant.
Figure 9:
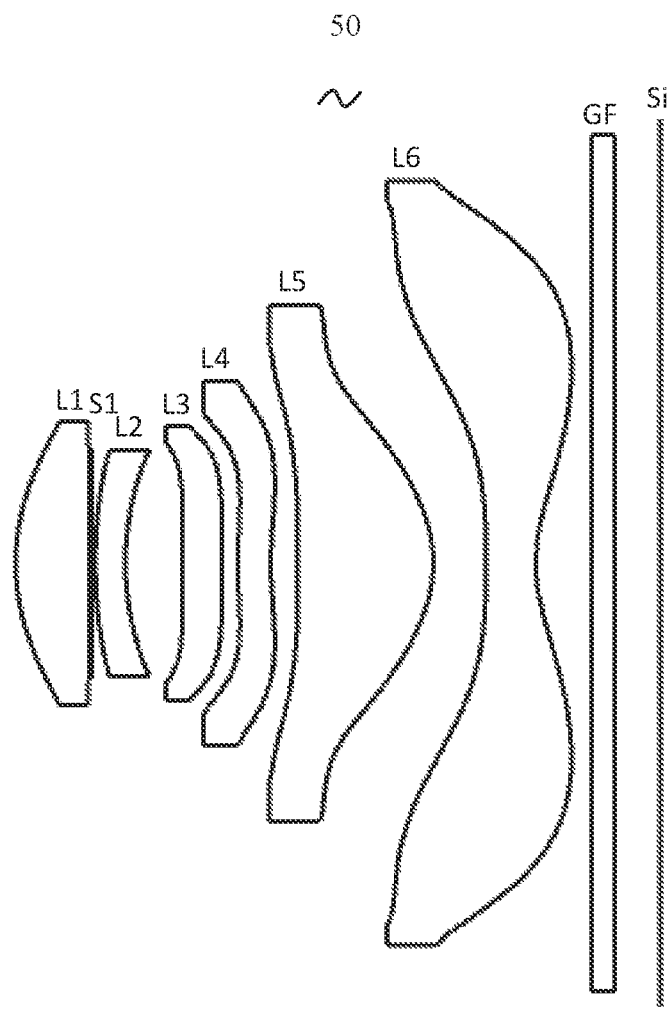
FIG. 9 is a structural schematic diagram of a camera optical lens in accordance with Embodiment 5 of the present disclosure.

FIG. 8 shows a situation where an RMS spot diameter of the camera optical lens 40 of Embodiment 4 is within a first quadrant. According to FIG. 8, it can be known that the camera optical lens 40 of Embodiment 4 can achieve good imaging quality.

Table 16 below further lists values corresponding to various conditions in the present embodiment according to the above conditions. The camera optical lens according to the present embodiment satisfies the above conditions.

In the present embodiment, the entrance pupil diameter ENPD of the camera optical lens is 2.267 mm. The image height (along a diagonal direction) IH is 7.810 mm, an image height in the x direction is 6.000 mm, an image height in the y direction is 5.000 mm, and the imaging effect is the best in this rectangular range. The FOV along a diagonal direction is 82.07°, an FOV in the x direction is 69.39°, and an FOV in the y direction is 60.40°. Thus, the camera optical lens 40 satisfies design requirements of ultra-thin and wide-angle while on-axis and off-axis aberrations are sufficiently corrected, thereby leading to better optical characteristics.

Embodiment 5

Embodiment 5 is basically the same as Embodiment 1 and involves symbols having the same meanings as Embodiment 1. Only differences therebetween will be described in the following.

An image-side surface of the first lens L1 is convex at a paraxial position. An object-side surface of the third lens L3 is convex at the paraxial position.

Table 13 and Table 14 show design data of a camera optical lens 50 in Embodiment 5 of the present disclosure. The object-side surface and image-side surface of the sixth lens L6 are free-form surfaces.

TABLE 13

| | R | | d | | nd | | vd | |
|---|---|---|---|---|---|---|---|---|
| S1 | ∞ | d0= | −0.680 | | | | | |
| R1 | 2.209 | d1= | 0.659 | nd1 | 1.5444 | v1 | 55.82 |
| R2 | −115.191 | d2= | 0.060 | | | | | |
| R3 | 5.117 | d3= | 0.270 | nd2 | 1.6800 | v2 | 18.40 |
| R4 | 2.657 | d4= | 0.520 | | | | | |
| R5 | 92.585 | d5= | 0.350 | nd3 | 1.5444 | v3 | 55.82 |
| R6 | 13.029 | d6= | 0.146 | | | | | |
| R7 | 3.464 | d7= | 0.300 | nd4 | 1.6800 | v4 | 18.40 |
| R8 | 3.022 | d8= | 0.244 | | | | | |
| R9 | 569.057 | d9= | 1.226 | nd5 | 1.5444 | v5 | 55.82 |
| R10 | −1.264 | d10= | 0.476 | | | | | |
| R11 | −12.415 | d11= | 0.450 | nd6 | 1.5438 | v6 | 56.03 |
| R12 | 1.451 | d12= | 0.500 | | | | | |
| R13 | ∞ | d13= | 0.210 | ndg | 1.5168 | vg | 64.17 |
| R14 | ∞ | d14= | 0.416 | | | | | |

Table 14 shows aspherical surface data of respective lenses in the camera optical lens 50 according to Embodiment 5 of the present disclosure.

TABLE 14

| | Conic coefficient | Aspherical coefficient | | | |
|---|---|---|---|---|---|
| | k | A4 | A6 | A8 | A10 |
| R1 | −4.1542E−01 | 3.5335E−03 | −1.4834E−03 | −3.6259E−04 | −9.5564E−04 |
| R2 | 3.6346E+01 | 2.8710E−02 | −3.5416E−02 | 1.9659E−02 | −8.2542E−03 |
| R3 | 5.7121E+00 | 1.0943E−02 | −2.7724E−02 | 3.6126E−02 | −2.2011E−02 |
| R4 | −2.3839E+00 | −2.4421E−03 | 3.9253E−02 | −1.0528E−01 | 1.8219E−01 |
| R5 | 8.5000E+01 | −7.1320E−02 | 2.3552E−01 | −1.0391E+00 | 2.4523E+00 |
| R6 | 6.5716E+01 | −2.1269E−01 | 4.4404E−01 | −8.9703E−01 | 1.0497E+00 |
| R7 | −2.7642E+01 | −2.8958E−01 | 4.9263E−01 | −8.7267E−01 | 1.0813E+00 |
| R8 | −1.8914E+01 | −2.0752E−01 | 2.8625E−01 | −3.9900E−01 | 4.0215E−01 |
| R9 | 9.0000E+01 | −7.0062E−02 | 6.4941E−02 | −6.8870E−02 | 5.6452E−02 |
| R10 | −2.3363E+00 | 1.0474E−02 | −5.3999E−02 | 5.6746E−02 | −3.8951E−02 |

| | Aspherical coefficient | | | | |
|---|---|---|---|---|---|
| | A12 | A14 | A16 | A18 | A20 |
| R1 | −5.2525E−04 | 0.0000E+00 | 0.0000E+00 | 0.0000E+00 | 0.0000E+00 |
| R2 | 1.2574E−03 | 0.0000E+00 | 0.0000E+00 | 0.0000E+00 | 0.0000E+00 |
| R3 | 8.0304E−03 | 0.0000E+00 | 0.0000E+00 | 0.0000E+00 | 0.0000E+00 |
| R4 | −1.5250E−01 | 5.1859E−02 | 0.0000E+00 | 0.0000E+00 | 0.0000E+00 |

TABLE 14-continued

| | | | | |
|---|---|---|---|---|
| R5 | −3.6343E+00 | 3.2565E+00 | −1.6264E+00 | 3.4719E−01 | 0.0000E+00 |
| R6 | −6.7649E−01 | 7.3084E−02 | 2.0729E−01 | −1.3582E−01 | 2.7913E−02 |
| R7 | −9.3735E−01 | 5.3058E−01 | −1.8188E−01 | 3.4374E−02 | −2.8071E−03 |
| R8 | −2.8741E−01 | 1.3891E−01 | −4.2500E−02 | 7.4003E−03 | −5.5808E−04 |
| R9 | −3.1974E−02 | 1.1864E−02 | −2.7017E−03 | 3.4036E−04 | −1.8159E−05 |
| R10 | 1.7883E−02 | −4.9846E−03 | 8.0404E−04 | −6.9227E−05 | 2.4668E−06 |

Table 15 shows free-form surface data in the camera optical lens 50 of Embodiment 5 of the present disclosure.

TABLE 15

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R11 | −1.1256E+01 | −5.9224E−02 | −1.1832E−01 | −5.9421E−02 | 1.1234E−02 | 3.3765E−02 | 3.3729E−02 | 1.1240E−02 |
| R12 | −6.5449E+00 | −3.9049E−02 | −7.7312E−02 | −3.8934E−02 | 9.5660E−03 | 2.8655E−02 | 2.8529E−02 | 9.5334E−03 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R11 | −1.8649E−03 | −9.3306E−04 | −1.8649E−04 | 2.4730E−05 | 1.4819E−04 | 3.7047E−04 | 4.9418E−04 | 3.7101E−04 |
| R12 | 1.6725E−03 | 8.3695E−04 | 1.6767E−04 | −8.8104E−06 | −5.2921E−05 | −1.3213E−04 | −1.7616E−04 | −1.3175E−04 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R11 | −9.4042E−06 | −1.3488E−06 | 2.7664E−08 | 2.2344E−07 | 7.8590E−07 | 1.5651E−06 | 1.9505E−06 | 1.5575E−06 |
| R12 | 1.1889E−06 | 1.6760E−07 | 1.7583E−09 | 1.2668E−08 | 4.2256E−08 | 8.2841E−08 | 1.0908E−07 | 8.4124E−08 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R11 | 0.0000E+00 | 0.0000E+00 | 0.0000E+00 | 0.0000E+00 | 0.0000E+00 | 0.0000E+00 | 0.0000E+00 | 0.0000E+00 |
| R12 | 0.0000E+00 | 0.0000E+00 | 0.0000E+00 | 0.0000E+00 | 0.0000E+00 | 0.0000E+00 | 0.0000E+00 | 0.0000E+00 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R11 | −1.1737E−04 | −4.8263E−04 | −7.1680E−04 | −4.9020E−04 | −1.2159E−04 | −1.8623E−04 | −9.3353E−04 | −1.8664E−03 |
| R12 | −1.6849E−03 | −6.7327E−03 | −1.0113E−02 | −6.7406E−03 | −1.6953E−03 | 1.6723E−04 | 8.3633E−04 | 1.6752E−03 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R11 | 1.4840E−04 | 2.4890E−05 | −1.3431E−06 | −9.4141E−06 | −2.8226E−05 | −4.7047E−05 | −4.7055E−05 | −2.8169E−05 |
| R12 | −5.3014E−05 | −8.7558E−06 | 1.7150E−07 | 1.1925E−06 | 3.5784E−06 | 5.9114E−06 | 6.0492E−06 | 3.5526E−06 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R11 | 7.8230E−07 | 2.1848E−07 | 2.6853E−08 | 0.0000E+00 | 0.0000E+00 | 0.0000E+00 | 0.0000E+00 | 0.0000E+00 |
| R12 | 2.4925E−08 | 2.9142E−08 | 1.6463E−09 | 0.0000E+00 | 0.0000E+00 | 0.0000E+00 | 0.0000E+00 | 0.0000E+00 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R11 | 0.0000E+00 | 0.0000E+00 | 0.0000E+00 | 0.0000E+00 | 0.0000E+00 | 0.0000E+00 | 0.0000E+00 | 0.0000E+00 |
| R12 | 0.0000E+00 | 0.0000E+00 | 0.0000E+00 | 0.0000E+00 | 0.0000E+00 | 0.0000E+00 | 0.0000E+00 | 0.0000E+00 |

Figure 10:
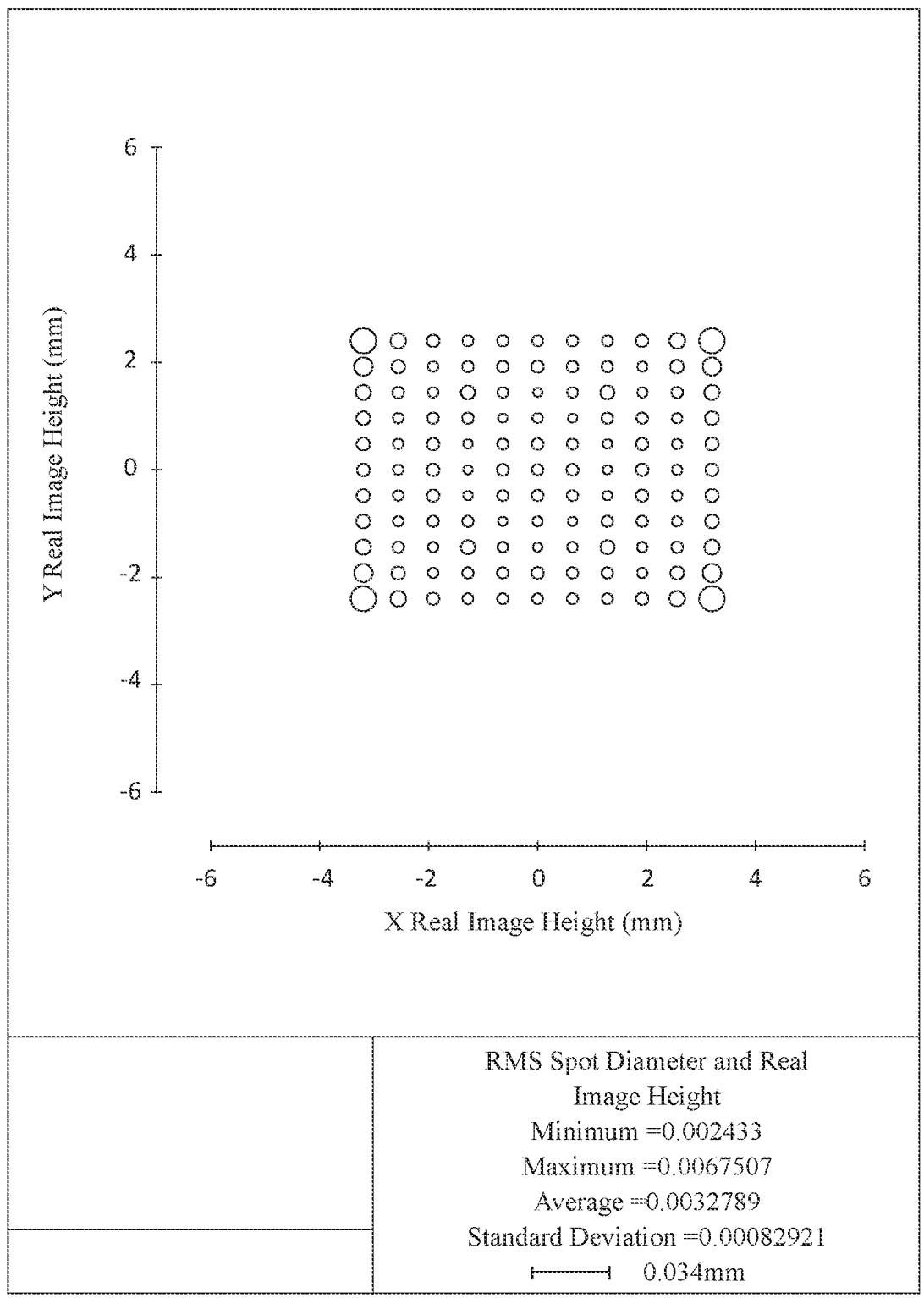
FIG. 10 is diagram showing a case where an RMS spot diameter of a camera optical lens shown in FIG. 9 is within a first quadrant.

FIG. 10 shows a situation where an RMS spot diameter of the camera optical lens 50 of Embodiment 5 is within a first quadrant. According to FIG. 10, it can be known that the camera optical lens 50 of Embodiment 5 can achieve good imaging quality.

Table 16 below lists values corresponding to the conditional expressions in the present embodiment according to the above conditional expressions. Apparently, the camera optical lens in the present embodiment satisfies the above conditional expressions.

In the present embodiment, the entrance pupil diameter ENPD of the camera optical lens is 2.303 mm. The image height (along a diagonal direction) IH is 8.000 mm, an image height in the x direction is 6.400 mm, an image height in the y direction is 4.800 mm, and the imaging effect is the best in this rectangular range. The FOV along a diagonal direction is 82.07°, an FOV in the x direction is 73.48°, and an FOV in the y direction is 58.18°. Thus, the camera optical lens 50 satisfies design requirements of ultra-thin and wide-angle while on-axis and off-axis aberrations are sufficiently corrected, thereby leading to better optical characteristics.

TABLE 16

| Parameters and conditional expressions | Embodiment 1 | Embodiment 2 | Embodiment 3 | Embodiment 4 | Embodiment 5 |
|---|---|---|---|---|---|
| f3/f1 | −1.67 | −1.75 | −83.09 | −79.78 | −6.99 |
| f2/f | −5.75 | −4.99 | −8.06 | −6.70 | −1.97 |
| (R7 + R8)/(R7 − R8) | 4.49 | 12.86 | 8.50 | 15.06 | 14.67 |

TABLE 16-continued

| Parameters and conditional expressions | Embodiment 1 | Embodiment 2 | Embodiment 3 | Embodiment 4 | Embodiment 5 |
|---|---|---|---|---|---|
| f | 4.251 | 4.238 | 4.132 | 4.194 | 4.260 |
| f1 | 5.178 | 4.916 | 4.632 | 4.824 | 3.972 |
| f2 | −24.438 | −21.136 | −33.293 | −28.080 | −8.404 |
| f3 | −8.621 | −8.576 | −384.852 | −384.848 | −27.778 |
| f4 | −7.812 | −38.498 | −23.913 | −50.002 | −47.617 |
| f5 | 1.897 | 2.232 | 2.927 | 2.958 | 2.309 |
| f6 | −2.580 | −2.530 | −2.286 | −2.330 | −2.352 |
| Fno | 1.85 | 1.85 | 1.85 | 1.85 | 1.85 |

Fno is an F number of the optical camera lens.

Those of ordinary skill in the art can understand that the above embodiments are some specific embodiments of the present disclosure. In practice, various modifications can be made in terms of the forms and details without departing from the spirit and scope of the present disclosure.

What is claimed is:

1. A camera optical lens, comprising, from an object side to an image side:
   a first lens having a positive refractive power;
   a second lens having a negative refractive power;
   a third lens having a negative refractive power;
   a fourth lens having a negative refractive power;
   a fifth lens having a positive refractive power; and
   a sixth lens having a negative refractive power,
   wherein the camera lens comprises a total of six lenses, wherein at least one of the first lens, the second lens, the third lens, the fourth lens, the fifth lens, or the sixth lens comprises a free-form surface, and wherein the camera optical lens satisfies following conditions:

$$f3/f1 \leq -1.50;$$

$$-8.50 \leq f2/f \leq -1.50;$$

$$4.00 \leq (R7+R8)/(R7-R8) \leq 16.00; \text{ and}$$

$$R9/R10 \leq -1.50,$$

where
f denotes a focal length of the camera optical lens,
f1 denotes a focal length of the first lens,
f2 denotes a focal length of the second lens,
f3 denotes a focal length of the third lens,
R7 denotes a curvature radius of an object-side surface of the fourth lens,
R8 denotes a curvature radius of an image-side surface of the fourth lens,
R9 denotes a curvature radius of an object-side surface of the fifth lens, and
R10 denotes a curvature radius of an image-side surface of the fifth lens.

2. The camera optical lens as described in claim 1, further satisfying a following condition:

$$0.30 \leq d6/d8 \leq 1.00,$$

where
d6 denotes an on-axis distance from an image-side surface of the third lens to the object-side surface of the fourth lens, and
d8 denotes an on-axis distance from the image-side surface of the fourth lens to an object-side surface of the fifth lens.

3. The camera optical lens as described in claim 1, wherein the first lens comprises an object-side surface being convex in a paraxial region, and further satisfying following conditions:

$$0.47 \leq f1/f \leq 1.83;$$

$$-4.50 \leq (R1+R2)/(R1-R2) \leq -0.64; \text{ and}$$

$$0.05 \leq d1/TTL \leq 0.22,$$

where
R1 denotes a curvature radius of an object-side surface of the first lens,
R2 denotes a curvature radius of an image-side surface of the first lens,
d1 denotes an on-axis thickness of the first lens, and
TTL denotes a total optical length from the object-side surface of the first lens to an image plane of the camera optical lens along an optic axis.

4. The camera optical lens as described in claim 1, wherein the second lens comprises an object-side surface being convex in a paraxial region and an image-side surface being concave in the paraxial region, and further satisfying following conditions:

$$1.58 \leq (R3+R4)/(R3-R4) \leq 12.63; \text{ and}$$

$$0.02 \leq d3/TTL \leq 0.07,$$

where
R3 denotes a curvature radius of an object-side surface of the second lens,
R4 denotes a curvature radius of an image-side surface of the second lens,
d3 denotes an on-axis thickness of the second lens, and
TTL denotes a total optical length from an object-side surface of the first lens to an image plane of the camera optical lens along an optic axis.

5. The camera optical lens as described in claim 1, further satisfying following conditions:

$$-186.28 \leq f3/f \leq -1.35;$$

$$-20.14 \leq (R5+R6)/(R5-R6) \leq 1.99; \text{ and}$$

$$0.03 \leq d5/TTL \leq 0.17,$$

where
R5 denotes a curvature radius of an object-side surface of the third lens,
R6 denotes a curvature radius of an image-side surface of the third lens,
d5 denotes an on-axis thickness of the third lens, and
TTL denotes a total optical length from an object-side surface of the first lens to an image plane of the camera optical lens along an optic axis.

6. The camera optical lens as described in claim 1, wherein the fourth lens comprises an object-side surface being convex in a paraxial region and an image-side surface being concave in the paraxial region, and further satisfying following conditions:

$$-23.84 \leq f4/f \leq -1.23; \text{ and}$$

$$0.02 \leq d7/TTL \leq 0.08,$$

where
f4 denotes a focal length of the fourth lens,
d7 denotes an on-axis thickness of the fourth lens, and
TTL denotes a total optical length from an object-side surface of the first lens to an image plane of the camera optical lens along an optic axis.

7. The camera optical lens as described in claim 1, wherein the fifth lens comprises an object-side surface being convex in a paraxial region and an image-side surface being concave in the paraxial region, and further satisfying following conditions:

$$0.22 \leq f5/f \leq 1.06$$

$$0.16 \leq (R9+R10)/(R9-R10) \leq 1.49; \text{ and}$$

$$0.08 \leq d9/TTL \leq 0.32,$$

where
f5 denotes a focal length of the fifth lens,
R9 denotes a curvature radius of an object-side surface of the fifth lens,
R10 denotes a curvature radius of an image-side surface of the fifth lens,
d9 denotes an on-axis thickness of the fifth lens, and
TTL denotes a total optical length from an object-side surface of the first lens to an image plane of the camera optical lens along an optic axis.

8. The camera optical lens as described in claim 1, wherein the sixth lens comprises an object-side surface being convex in a paraxial region and an image-side surface being concave in the paraxial region, and further satisfying following conditions:

$-1.21 \leq f6/f \leq -0.37$;

$0.07 \leq (R11+R12)/(R11-R12) \leq 1.19$; and $0.04 \leq d11/TTL \leq 0.13$, where
f6 denotes a focal length of the sixth lens,
R11 denotes a curvature radius of an object-side surface of the sixth lens,
R12 denotes a curvature radius of an image-side surface of the sixth lens,
d11 denotes an on-axis thickness of the sixth lens, and
TTL denotes a total optical length from an object-side surface of the first lens to an image plane of the camera optical lens along an optic axis.

9. The camera optical lens as described in claim 1, further satisfying a following condition:

$Fno \leq 1.91$, where
Fno denotes an F number of the camera optical lens.

* * * * *